US012613253B2

(12) United States Patent
Evje et al.

(10) Patent No.: US 12,613,253 B2
(45) Date of Patent: Apr. 28, 2026

(54) SYSTEMS AND METHODS FOR INTERFACING WITH A BOTTLE

(71) Applicant: 10x Genomics, Inc., Pleasanton, CA (US)

(72) Inventors: Eric Evje, Oakland, CA (US); Hendricus Marindra, Pleasanton, CA (US); Xin Yao, Fremont, CA (US)

(73) Assignee: 10X GENOMICS, INC., Pleasanton, CA (US)

( * ) Notice: Subject to any disclaimer, the term of this patent is extended or adjusted under 35 U.S.C. 154(b) by 256 days.

(21) Appl. No.: 18/512,809

(22) Filed: Nov. 17, 2023

(65) Prior Publication Data

US 2024/0168047 A1 May 23, 2024

Related U.S. Application Data

(60) Provisional application No. 63/427,411, filed on Nov. 22, 2022.

(51) Int. Cl.
G01N 35/10 (2006.01)

(52) U.S. Cl.
CPC ..................................... G01N 35/10 (2013.01)

(58) Field of Classification Search
CPC ................................................... G01N 35/10
USPC ....................................................... 73/864.84
See application file for complete search history.

(56) References Cited

U.S. PATENT DOCUMENTS

| | | | |
|---|---|---|---|
| 5,599,675 A | 2/1997 | Brenner | |
| 5,750,341 A | 5/1998 | Macevicz | |

| | | | |
|---|---|---|---|
| 6,172,218 B1 | 1/2001 | Brénner | |
| 6,306,597 B1 | 10/2001 | Macevicz | |
| 6,969,488 B2 | 11/2005 | Bridgham et al. | |
| 7,057,026 B2 | 6/2006 | Barnes et al. | |
| 7,632,641 B2 | 12/2009 | Dirks et al. | |
| 7,709,198 B2 | 5/2010 | Luo et al. | |
| 8,551,710 B2 | 10/2013 | Bernitz et al. | |
| 8,604,182 B2 | 12/2013 | Luo et al. | |
| 8,658,361 B2 | 2/2014 | Wu et al. | |
| 8,951,726 B2 | 2/2015 | Luo et al. | |
| 9,217,178 B2 | 12/2015 | Fedurco et al. | |

(Continued)

FOREIGN PATENT DOCUMENTS

| | | |
|---|---|---|
| WO | WO 2018/026873 | 2/2018 |
| WO | WO 2021/138676 | 7/2021 |
| WO | WO 2021/167526 | 8/2021 |

OTHER PUBLICATIONS

Chen et al., "Spatially Resolved, Highly Multiplexed RNA Profiling in Single Cells", Science, 348(6233): aaa6090, 2015.

(Continued)

*Primary Examiner* — Peter J Macchiarolo
*Assistant Examiner* — Rodney T Frank
(74) *Attorney, Agent, or Firm* — Stephen J. Kenny; Nicole A. Bustos-Pomerantz; Foley Hoag LLP

(57) ABSTRACT

A bottle connection assembly is configured to seal a bottle and provide a fluidic path between the interior of the bottle and its exterior for drawing fluids therefrom. The fluids can be reagents used for preparing a sample for the identification of target molecules. A bottle cap for capping the bottle is positioned below the bottle interface assembly and includes a female fitting configured to engage with a male fitting of the bottle interface assembly to form a sealed fluidic connection.

20 Claims, 18 Drawing Sheets

(56) References Cited

U.S. PATENT DOCUMENTS

| | | | |
|---|---|---|---|
| 10,138,509 B2 | 11/2018 | Church et al. | |
| 10,179,932 B2 | 1/2019 | Church et al. | |
| 10,450,599 B2 | 10/2019 | Pierce et al. | |
| 10,457,980 B2 | 10/2019 | Cai et al. | |
| 10,494,662 B2 | 12/2019 | Church et al. | |
| 10,550,429 B2 | 2/2020 | Harada et al. | |
| 2005/0100900 A1 | 5/2005 | Kawashima et al. | |
| 2006/0099716 A1* | 5/2006 | Tipler | G01N 30/16 |
| | | | 422/89 |
| 2006/0188901 A1 | 8/2006 | Barnes et al. | |
| 2006/0240439 A1 | 10/2006 | Smith et al. | |
| 2006/0281109 A1 | 12/2006 | Ost et al. | |
| 2007/0166705 A1 | 7/2007 | Milton et al. | |
| 2009/0118128 A1 | 5/2009 | Liu et al. | |
| 2011/0059865 A1 | 3/2011 | Smith et al. | |
| 2012/0270305 A1 | 10/2012 | Reed et al. | |
| 2013/0079232 A1 | 3/2013 | Kain et al. | |
| 2013/0260372 A1 | 10/2013 | Buermann et al. | |
| 2016/0024555 A1 | 1/2016 | Church et al. | |
| 2016/0108458 A1 | 4/2016 | Frei et al. | |
| 2016/0369329 A1 | 12/2016 | Cai et al. | |
| 2017/0009278 A1 | 1/2017 | Söderberg et al. | |
| 2017/0220733 A1 | 8/2017 | Zhuang et al. | |
| 2019/0055594 A1 | 2/2019 | Samusik et al. | |
| 2019/0106733 A1 | 4/2019 | Kishi et al. | |
| 2019/0161796 A1 | 5/2019 | Hauling et al. | |
| 2019/0177800 A1 | 6/2019 | Boutet et al. | |
| 2019/0194709 A1 | 6/2019 | Church et al. | |
| 2019/0367969 A1 | 12/2019 | Belhocine et al. | |
| 2020/0030806 A1* | 1/2020 | Irmscher | F04B 7/04 |
| 2020/0224243 A1 | 7/2020 | Desai et al. | |
| 2020/0224244 A1 | 7/2020 | Nilsson et al. | |
| 2021/0164039 A1 | 6/2021 | Wang et al. | |
| 2021/0340618 A1 | 11/2021 | Kühnemund et al. | |
| 2022/0010358 A1 | 1/2022 | Kühnemund et al. | |
| 2022/0016624 A1* | 1/2022 | Daugharthy | B01L 3/502707 |
| 2022/0064697 A1 | 3/2022 | Zhuang et al. | |
| 2022/0280944 A1* | 9/2022 | Navawongse | G01N 33/554 |
| 2024/0142480 A1* | 5/2024 | Gilmore | G01N 1/10 |
| 2024/0168047 A1* | 5/2024 | Evje | G01N 35/10 |

OTHER PUBLICATIONS

Choi et al., "Third-Generation In Situ Hybridization Chain Reaction: Multiplexed, Quantitative, Sensitive, Versatile, Robust", *Development*, 145(12): dev165753, 2018.

Eng et al., "Transcriptome-Scale Super-Resolved Imaging in Tissues by RNA SeqFish+", *Nature*, 568(7751): 235-239, 2019.

Frei et al., "Highly Multiplexed Simultaneous Detection of RNAs and Proteins in Single Cells", *Nat Methods*, 13(3): 269-275, 2016.

Goh et al., "Highly Specific Multiplexed RNA Imaging in Tissues With Split-Fish", *Nat Methods*, 17(7): 689-693, 2020.

Gyllborg et al., "Hybridization-Based In Situ Sequencing (HybISS) for Spatially Resolved Transcriptomics in Human and Mouse Brain Tissue", *Nucleic Acid Res*, 48(19): e112, 2020.

Lee et al., "Highly Multiplexed Subcellular RNA Sequencing In Situ", *Science*, 342(6177): 1360-1363, 2014.

Mitra et al., "Fluorescent In Situ Sequencing on Polymerase Colonies", *Anal. Biochem*, 320: 55-65, 2003.

Moffitt et al., "RNA Imaging With Multiplexed Error-Robust Fluorescence In Situ Hybridization (MERFISH)", *Methods of Enzymology*, 572: 1-49, 2016.

Nagendran et al., "Automated Cell-Type Classification in Intact Tissues by Single-Cell Molecular Profiling", *eLife*, 7: e30510, 2018.

Shendure et al., "Accurate Multiplex Polony Sequencing of an Evolved Bacterial Genome", *Science*, 309: 1728-1732, 2005.

Tripathi et al., "Z Probe, an Efficient Tool for Characterizing Long Non-Coding RNA in FFPE Tissues", *Noncoding RNA*, 4(3): 20, 2018.

Wang et al., "Three-Dimensional Intact-Tissue Sequencing of Single-Cell Transcriptional States", *Science*, 361(6499): 5691, 2018.

Wu et al., "RollFish Achieves Robust Quantification of Single-Molecule RNA Biomarkers in Paraffin-Embedded Tumor Tissue Samples", *Commun Biol*, 1, 209, 2018.

Yang et al., "Single-Cell Phenotyping Within Transparent Intact Tissue Through Whole-Body Clearing", *Cell*, 158(4): 945-958, 2014.

International Search Report and Written Opinion for Application No. PCT/US23/80207, mailed Mar. 22, 2024, 24 pages.

* cited by examiner

SYSTEMS AND METHODS FOR INTERFACING WITH A BOTTLE

CROSS REFERENCE TO RELATED APPLICATION

This application claims priority to U.S. provisional patent application Ser. No. 63/427,411, filed Nov. 22, 2022, the entire content of which is incorporated herein by reference and relied upon.

FIELDS OF THE DISCLOSURE

The present disclosure is directed to systems, methods, and assemblies for interfacing with a bottle. In particular, the present disclosure describes a bottle connection assembly configured to releasably couple to a bottle and provide a sealed fluidic path between the interior of the bottle and its exterior for drawing fluids therefrom.

SUMMARY

Various embodiments of the present disclosure disclose an assembly that comprises a base, a release lever, a cam, a brake bar, a straight shaft, a gross alignment member, and a male element. In various embodiments, the base may include at least one projection. Further, the release lever may include a first lever section and a second lever section, where the release lever is rotatably hinged to the base at the first lever section. In addition, the cam may have a first cam section and a second cam section, where the first cam section is rotatably hinged to the projection of the base at a first hinge point and the second cam section is coupled to the second lever section of the release lever. The brake bar further includes a first bar section and a second bar section, where the first bar section is coupled to the first lever end at a coupling point and the second bar end has a bore. The straight shaft may extend through the bore. The gross alignment member is fixedly connected to the base and includes a bottom having a gross alignment member opening. Further, the male element includes a first male element section and a second male element section, where the first male element section extends through the gross alignment member opening of the gross alignment member and the second male element section is disposed within the gross alignment member and fixedly connected to the base. In various embodiments, the release lever, the cam, and the brake bar have a resting configuration and an actuated configuration. In the resting configuration, the brake bar forms a non-perpendicular angle with the straight shaft to limit a relative motion between the brake bar and the straight shaft. In the actuated configuration, the brake bar forms a substantially perpendicular angle with the straight shaft to thereby allow the relative motion between the brake bar and the straight shaft.

BRIEF DESCRIPTION OF THE DRAWINGS

For a more complete understanding of the principles disclosed herein, and the advantages thereof, reference is now made to the following descriptions taken in conjunction with the accompanying drawings, in which.

Figure 1:
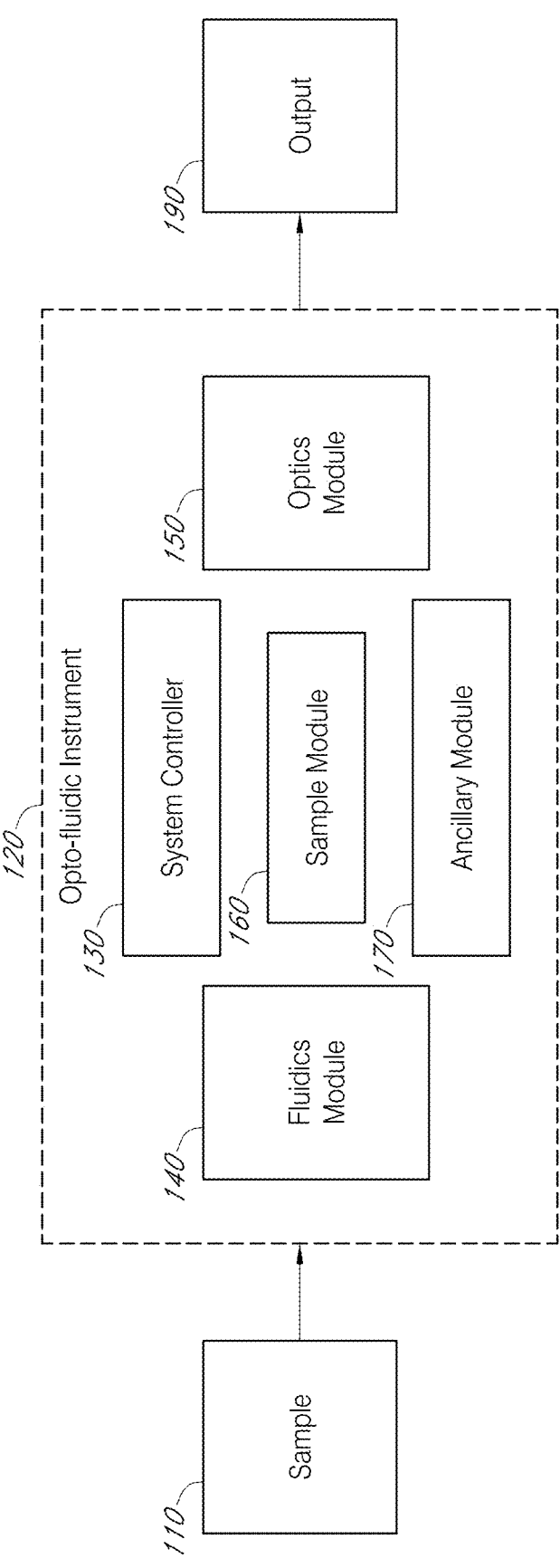
FIG. 1 is an example workflow of analysis of a biological sample (e.g., a cell or tissue sample) using an opto-fluidic instrument, according to various embodiments.

It is to be understood that the figures are not necessarily drawn to scale, nor are the objects in the figures necessarily drawn to scale in relationship to one another. The figures are depictions that are intended to bring clarity and understanding to various embodiments of apparatuses, systems, and methods disclosed herein. Wherever possible, the same reference numbers will be used throughout the drawings to refer to the same or like parts. Moreover, it should be appreciated that the drawings are not intended to limit the scope of the present teachings in any way.

DETAILED DESCRIPTION

I. Overview

Target molecules (e.g., nucleic acids, proteins, antibodies, etc.) can be detected in biological samples (e.g., one or more cells or a tissue sample) using an instrument having integrated optics and fluidics modules (an "opto-fluidic instrument"). In an opto-fluidic instrument, the fluidics module is configured to deliver one or more reagents (e.g., fluorescent probes) to the biological sample and/or remove spent reagents therefrom. Additionally, the optics module is configured to illuminate the biological sample with light having one or more spectral emission curves (over a range of wavelengths) and subsequently capture one or more images of emitted light signals from the biological sample during one or more probing cycles. In various embodiments, the captured images may be processed in real time and/or at a later time to determine the presence of the one or more target molecules in the biological sample, as well as three-dimensional position information associated with each detected target molecule. Additionally, the opto-fluidics instrument includes a sample module configured to receive (and, optionally, secure) one or more biological samples. In some instances, the sample module includes an X-Y stage configured to move the biological sample along an X-Y plane (e.g., perpendicular to an objective lens of the optics module).

In various embodiments, the opto-fluidic instrument is configured to analyze one or more target molecules in their naturally occurring place (i.e., in situ) within the biological sample. For example, an opto-fluidic instrument may be an in situ analysis system used to analyze a biological sample and detect target molecules including but not limited to DNA, RNA, proteins, antibodies, etc.

A sample disclosed herein can be or be derived from any biological sample. Biological samples may be obtained from any suitable source using any of a variety of techniques including, but not limited to, biopsy, surgery, and laser capture microscopy (LCM), and generally includes cells, tissues, and/or other biological material from the subject. A biological sample can be obtained from a prokaryote such as a bacterium, an archaea, a virus, or a viroid. A biological sample can also be obtained from eukaryotic mammalian and eukaryotic non-mammalian organisms (e.g., a plant, a fungus, an insect, an arachnid, a nematoda, a reptile, or an amphibian). A biological sample from an organism may comprise one or more other organisms or components therefrom. For example, a mammalian tissue section may comprise a prion, a viroid, a virus, a bacterium, a fungus, or components from other organisms, in addition to mammalian cells and non-cellular tissue components. Subjects from which biological samples can be obtained can be healthy or asymptomatic subjects, subjects that have or are suspected of having a disease (e.g., an individual with a disease such as cancer) or a pre-disposition to a disease, and/or subjects in need of therapy or suspected of needing therapy.

The biological sample can include any number of macromolecules, for example, cellular macromolecules and organelles (e.g., mitochondria and nuclei). The biological sample can be obtained as a tissue sample, such as a tissue section, biopsy, a core biopsy, needle aspirate, or fine needle aspirate. The sample can be a fluid sample, such as a blood sample, urine sample, or saliva sample. The sample can be a skin sample, a colon sample, a cheek swab, a histology sample, a histopathology sample, a plasma or serum sample, a tumor sample, living cells, cultured cells, a clinical sample such as, for example, whole blood or blood-derived products, blood cells, or cultured tissues or cells, including cell suspensions.

In some embodiments, the biological sample may comprise cells or a tissue sample which are deposited on a substrate. As described herein, a substrate can be any support that is insoluble in aqueous liquid and allows for positioning of biological samples, analytes, features, and/or reagents on the support. In some embodiments, a biological sample is attached to a substrate. In some embodiments, the substrate is optically transparent to facilitate analysis on the opto-fluidic instruments disclosed herein. For example, in some instances, the substrate is a glass substrate (e.g., a microscopy slide, cover slip, or other glass substrate). Attachment of the biological sample can be irreversible or reversible, depending upon the nature of the sample and subsequent steps in the analytical method. In certain embodiments, the sample can be attached to the substrate reversibly by applying a suitable polymer coating to the substrate and contacting the sample to the polymer coating. The sample can then be detached from the substrate, e.g., using an organic solvent that at least partially dissolves the polymer coating. Hydrogels are examples of polymers that are suitable for this purpose. In some embodiments, the substrate can be coated or functionalized with one or more substances to facilitate attachment of the sample to the substrate. Suitable substances that can be used to coat or functionalize the substrate include, but are not limited to, lectins, poly-lysine, antibodies, and polysaccharides.

A variety of steps can be performed to prepare or process a biological sample for and/or during an assay using the opto-fluidic instruments disclosed herein. Except where indicated otherwise, the preparative or processing steps described below can generally be combined in any manner and in any order to appropriately prepare or process a particular sample for and/or analysis.

For example, a biological sample can be harvested from a subject (e.g., via surgical biopsy, whole subject sectioning) or grown in vitro on a growth substrate or culture dish as a population of cells and prepared for analysis as a tissue slice or tissue section (e.g., a fresh frozen, fixed frozen, or formalin fixed paraffin embedded (FFPE) tissue section). The thickness of a tissue section typically depends on the method used to prepare the section and the physical characteristics of the tissue, and therefore sections having a wide variety of different thicknesses can be prepared and used.

In some instances, the biological sample is fixed in any of a variety of suitable fixatives to preserve the biological structure of the sample prior to analysis. Exemplary fixatives include formalin, formaldehyde, ethanol, methanol, acetone, paraformaldehyde (PFA)-Triton, and combinations thereof.

In some embodiments, a biological sample can be permeabilized to facilitate transfer of analytes out of the sample, and/or to facilitate transfer of species (such as probes or probes sets) into the sample. In general, a biological sample can be permeabilized by exposing the sample to one or more permeabilizing agents. Suitable agents for this purpose include, but are not limited to, organic solvents (e.g., acetone, ethanol, and methanol), cross-linking agents (e.g., paraformaldehyde), detergents (e.g., saponin, Triton X-100™ or Tween-20™), and enzymes (e.g., trypsin, proteases).

In some embodiments, the biological sample is embedded in a polymer and/or crosslinked matrix (e.g., a hydrogel matrix). Embedding the sample in this manner typically involves contacting the biological sample with a hydrogel such that the biological sample becomes surrounded by the hydrogel. For example, the sample (e.g., a tissue section on a substrate, such as a glass substrate) can be embedded by contacting the sample with a suitable polymer material and activating the polymer material to form a hydrogel. In some embodiments, the hydrogel is formed such that the hydrogel is internalized within the biological sample. In some embodiments, the biological sample (including biological analytes) is immobilized in the hydrogel via cross-linking of the polymer material that forms the hydrogel. Cross-linking can be performed chemically and/or photochemically, or alternatively by any other suitable hydrogel-formation method. In some instances, biological molecules (or derivatives thereof) are cross-linked or otherwise covalently attached to the hydrogel. For example, in some embodiments, nucleic acid molecules (or derivatives thereof, such as an amplification product or probe(s) bound to cellular nucleic acid molecule) in a tissue sample are cross-linked or otherwise covalently attached to the hydrogel.

Hydrogels embedded within biological samples can be cleared using any suitable method. For example, electrophoretic tissue clearing methods or surfactant-based (e.g., sodium dodecyl sulfate (SDS)) clearing methods can be used to remove biological macromolecules from the hydrogel-embedded sample.

Tissue clearing is a process of optically resolving a sample or complex biological material, such as whole organs, large tissue, and cellular models, with minimal changes to morphology and without compromising the ability for immunolabeling or fluorescence imaging detection. In various embodiments, refractive index matching is used for obtaining fluorescence images. Mismatching among mediums can cause loss of imaging resolution, as light may also travel through the sample itself, a mounting media, glass coverslip, oil, and/or a microscope objective. In various embodiments, the amount of variable scattering of light from cellular membranes, lipids, and/or molecules of the specimen is reduced (e.g., minimized) using the various methods described herein. Heterogeneity of scattering among the cellular components may lead to an increase in opaqueness of an image. In various embodiments, a denser makeup of lipids, trafficking organelles, and other subcellular molecules may increase lateral, or non-forward, light scattered. In various embodiments, non-forward light scattering in situ may not pass through the specimen, as it is exacerbated by the continuous, pinball like, interactions of scattered light with neighboring molecules. In various embodiments, through the multiplicity of scattering, refraction, and absorbance the energy of light may be reduced or ultimately lost, leading to a distorted and white, non-translucent image. In various embodiments, a clearing reagent and mountant optically clears the sample by matching the refractive index to minimizing the light scattering through the specimen and to the microscope objective.

In various embodiments, optical clearing may be performed via various different approaches, primarily being divided into chemical and matrix-based approaches. In various embodiments, chemical approaches include aqueous-based or solvent-based approaches to achieve a highly resolved 3D image for immunolabeling, immuno-cytochemistry, immuno-histochemistry, and/or immunofluorescence. In various embodiments, aqueous-based clearing approaches are generally used to avoid dehydration and toxicity, which can destroy the integrity of a sample.

In various embodiments, passive clarity technique (PACT) is a passive tissue clearing and immunolabeling protocol. In various embodiments, PACT is used for intact thick organs. In various embodiments, RIMS includes a protocol for passive tissue clearing and immunostaining of intact organs that is compatible for long-term storage and has imaging media that preserves fluorescent markers over months.

In various embodiments, refractive index matching solutions (RIMS) may be produced with sugar or glycerol for simple, passive immersion. This may be used with thinner or smaller samples, as they are easier to clear and can maintain fluorescent protein emission. In various embodiments, such immersion techniques may achieve less than 1.5 refractive index and can take days to achieve clearing, resulting in reduced image quality when compared to solvent approaches, due to refractive index mismatching between the cleared sample, the glass coverslip, and immersion oil (glass and oil have an RI of 1.51). As sugar or glycerol solutions may take extended periods for clearing, a sample can experience considerable shrinkage while losing lipid content. In various embodiments, commercially available solutions control morphological alterations and loss of lipid content while achieving a higher refractive index of 1.52. In various embodiments, considerations for clearing include sample type and thickness so that there is minimal shrinkage of the sample and preservation of lipid content and fluorescence.

In various embodiments, perfusion-assisted agent release in situ (PARS) includes a method for whole-body clearing and phenotyping compatible with endogenous fluorescence. In various embodiments, all steps for PARS, including preservation, clearing, and labeling, are performed in situ prior to tissue extraction. In various embodiments, PARS, together with RIMS, transform opaque, intact, whole-organisms into optically transparent, fluorescently labeled samples for visualization with conventional confocal microscopy and phenotypic analysis at the cellular, subcellular, and/or single-molecule transcripts level as described in Yang et al., "Single-Cell Phenotyping within Transparent Intact Tissue through Whole-Body Clearing" *Cell.* 158(4): 945-958 (2014) (https://doi.org/10.1016/j.cell.2014.07.017).

A biological sample may comprise one or a plurality of analytes of interest. The opto-fluidic instruments disclosed herein can be used to detect and analyze a wide variety of different analytes. In some aspects, an analyte can include any biological substance, structure, moiety, or component to be analyzed. For example, the analyte may include any biomolecule or chemical compound, including a macromolecule such as a protein or peptide, a lipid or a nucleic acid molecule, or a small molecule, including organic or inorganic molecules. The analyte may be a cell or a microorganism, including a virus, or a fragment or product thereof. An analyte can be any substance or entity for which a specific binding partner (e.g., an affinity binding partner) can be developed and detected (e.g., using the opto-fluidic instruments disclosed herein).

Analytes of particular interest may include nucleic acid molecules, such as DNA (e.g. genomic DNA, mitochondrial DNA, plastid DNA, viral DNA, etc.) and RNA (e.g. mRNA, microRNA, rRNA, snRNA, viral RNA, etc.), and synthetic and/or modified nucleic acid molecules, (e.g. including nucleic acid domains comprising or consisting of synthetic or modified nucleotides such as LNA, PNA, morpholino, etc.), proteinaceous molecules such as peptides, polypeptides, proteins or prions or any molecule which includes a protein or polypeptide component, etc., or fragments thereof. The analyte may be a single molecule or a complex that contains two or more molecular subunits, e.g., including but not limited to complexes between proteins or peptides and nucleic acid molecules such as DNA or RNA, e.g., interactions between proteins and nucleic acids, e.g., regulatory factors, such as transcription factors, and DNA or RNA.

In some embodiments, the opto-fluidic instruments described herein can be utilized for the in situ detection and analysis of cellular analytes, (such as nucleic acid sequences), such as fluorescent in situ hybridization (FISH)-based methods, in situ transcriptomic analysis, or in situ sequencing, for example from intact tissues or samples in which the spatial information has been preserved. In some aspects, the embodiments can be applied in an imaging or detection method for multiplexed nucleic acid analysis. In some aspects, the provided opto-fluidic instruments can be used to detect a signal associated with a detectable label of a nucleic acid probe that is hybridized to a target sequence of a target nucleic acid in a biological sample.

Disclosed herein, in some aspects, are labelling agents (e.g., nucleic acid probes and/or probe sets) that are introduced into a cell or used to otherwise detect an analyte in a biological sample such as a tissue sample. The labelling agents include nucleic acid-based probes (e.g., the primary probes disclosed herein and/or any detectable probe disclosed herein) and may comprise any of a variety of entities that can hybridize to a nucleic acid, typically by Watson-Crick base pairing, such as DNA, RNA, LNA, PNA, etc. The nucleic acid probes may comprise a hybridization region that is able to directly or indirectly bind to at least a portion of a target sequence in a target nucleic acid. The nucleic acid probe may be able to bind to a specific target nucleic acid (e.g., an mRNA, or other nucleic acids disclosed herein).

Specific probe designs can vary depending on the application and any suitable probe or probe set may be utilized and detected using the opto-fluidic instruments described herein. In some aspects, the probes or probe sets described herein, or intermediate probes (e.g., a secondary probe, and/or a higher order probe) can be selected from the group consisting of a circular probe, a circularizable probe, and a linear probe. In some embodiments, a circular probe is pre-circularized prior to hybridization to a target nucleic acid and/or one or more other probes. In some embodiments, a circularizable probe is circularized (e.g., by ligation) upon hybridization to a target nucleic acid and/or one or more other probes such as a splint. In some embodiments, a linear probe can be one that comprises a target recognition sequence and a sequence that does not hybridize to a target nucleic acid, such as a 5' overhang, a 3' overhang, and/or a linker or spacer (which may comprise a nucleic acid sequence, such a one or more barcode sequence, or a non-nucleic acid moiety). In some embodiments, the sequence (e.g., the 5' overhang, 3' overhang, and/or linker or spacer) is non-hybridizing to the target nucleic acid but may hybridize to one another and/or one or more other probes, such as detectably labeled probes.

In some embodiments, a primary probe, a secondary probe, and/or a higher order probe disclosed herein can comprise a padlock-like probe or probe set, such as one described in U.S. Pat. No. 8,551,710, US 2020/0224244, US 2019/0055594, US 2021/0164039, US 2016/0108458, or US 2020/0224243, each of which is incorporated herein by reference in its entirety. Any suitable combination of the probe designs described herein can be used.

In some embodiments, the probes or probe sets described herein (e.g., a primary probe,) or a secondary probe, and/or a higher order probe disclosed herein can comprise two or more parts. In some cases, a probe can comprise one or more features of and/or be modified based on: a split FISH probe or probe set described in WO 2021/167526A1 or Goh et al., "Highly specific multiplexed RNA imaging in tissues with split-FISH," Nat Methods 17(7):689-693 (2020), which are incorporated herein by reference in their entireties; a Z-probe or probe set, such as one described in U.S. Pat. Nos. 7,709,198 B2, 8,604,182 B2, 8,951,726 B2, 8,658,361 B2, or Tripathi et al., "Z Probe, An Efficient Tool for Characterizing Long Non-Coding RNA in FFPE Tissues," *Noncoding RNA* 4(3):20 (2018), which are incorporated herein by reference in their entireties; an HCR initiator or amplifier, such as one described in U.S. Pat. No. 7,632,641 B2, US 2017/0009278 A1, U.S. Pat. No. 10,450,599 B2, or Choi et al., "Third-generation in situ hybridization chain reaction: multiplexed, quantitative, sensitive, versatile, robust," *Development* 145(12): dev165753 (2018), which are incorporated herein by reference in their entireties; a PLAYR probe or probe set, such as one described in US 2016/0108458 A1 or Frei et al., "Highly multiplexed simultaneous detection of RNAs and proteins in single cells," *Nat Methods* 13(3):269-75 (2016), which are incorporated herein by reference in their entireties; a PLISH probe or probe set, such as one described in US 2020/0224243 A1 or Nagendran et al., "Automated cell-type classification in intact tissues by single-cell molecular profiling," *elife* 7:e30510 (2018), which are incorporated herein by reference in their entireties; a RollFISH probe or probe set such as one described in Wu et al., "RollFISH achieves robust quantification of single-molecule RNA biomarkers in paraffin-embedded tumor tissue samples," *Commun Biol* 1, 209 (2018), which is hereby incorporated by reference in its entirety; a MER-FISH probe or probe set, such as one described in US 2022/0064697 A1 or Chen et al., "Spatially resolved, highly multiplexed RNA profiling in single cells," *Science* 348 (6233): aaa6090 (2015), which are incorporated herein by reference in their entireties; a primer exchange reaction (PER) probe or probe set, such as one described in US 2019/0106733 A1, which is hereby incorporated by reference in its entirety.

In some instances, probes and/or probe sets are directly labeled with one or more detectable labels (e.g., an optically detectable label, such as a florescent moiety) that are detected on the opto-fluidic instruments disclosed herein. In other instances, probes and/or probe sets comprise a target binding region and one or more nucleic acid barcode sequences that identify the analyte. In these embodiments, the barcode sequence(s) may be detected on the opto-fluidic instruments disclosed herein to identify the analyte in the sample. In some instances, a probe or probe set disclosed herein is a circularizable probe or probe set (e.g., a padlock probe or padlock-like probe) comprising a barcode region comprising one or more barcode sequences.

The probes and/or probe sets describe herein may comprise any suitable number of barcode sequences. In some embodiments, the probes or probe sets may comprise 1, 2, 3, 4, 5, 6, 7, 8, 9, 10, 11, 12, 13, 14, 15 or more, 20 or more, 30 or more, 40 or more, or 50 or more barcode sequences. As an illustrative example, a first probe may contain a first target-binding sequence, a first barcode sequence, and a second barcode sequence, while a second, different probe may contain a second target-binding sequence (that is different from the first target-binding sequence in the first probe), the same first barcode sequence as in the first probe, but a third barcode sequence instead of the second barcode sequence. Such probes may thereby be distinguished by determining the various barcode sequence combinations present or associated with a given probe at a given location in a sample.

In some embodiments, a labelling agent may include analyte binding moiety that interacts with an analyte (e.g., a protein) in the sample (e.g., a cell or tissue sample) and a reporter oligonucleotide comprising one or more barcode sequences associated with the analyte and/or analyte binding moiety. For example, a labelling agent that is specific to one type of cell feature (e.g., a first protein) may have coupled thereto a first reporter oligonucleotide, while a labelling agent that is specific to a different cell feature (e.g., a second protein) may have a different reporter oligonucleotide coupled thereto. In some embodiments, an analyte binding moiety includes, but is not limited to, a protein, a peptide, an antibody (or an epitope binding fragment thereof), a lipophilic moiety (such as cholesterol), a cell surface receptor binding molecule, a receptor ligand, a small molecule, a bi-specific antibody, a bi-specific T-cell engager, a T-cell receptor engager, a B-cell receptor engager, a pro-body, an aptamer, a monobody, an affimer, a darpin, and a protein scaffold, or any combination thereof. For a description of exemplary labelling agents, reporter oligonucleotides, and methods of use, see, e.g., U.S. Pat. No. 10,550,429; U.S. Pat.

Pub. 20190177800; and U.S. Pat. Pub. 20190367969, which are each incorporated by reference herein in their entirety.

In some embodiments, the nucleic acid probes, probe sets, reporter oligonucleotides, barcode sequences, etc. may be detected directly on the opto-fluidic instruments disclosed herein (e.g., primary probes comprise a detectable label, such as a florescent moiety), and/or by using secondary (or higher order) nucleic acid probes able to bind to the primary probes. In some embodiments, the nucleic acid probes (e.g., primary probes and/or secondary probes) are compatible with one or more biological and/or chemical reactions. For instance, a nucleic acid probe disclosed herein can serve as a template or primer for a polymerase (e.g., a circularized probe in a rolling circle amplification (RCA) reaction), a template or substrate for a ligase, a substrate for a click chemistry reaction, and/or a substrate for a nuclease (e.g., endonuclease or exonuclease for cleavage or digestion). In some instances, labelling agents (such as a primary probe set) are added to a biological sample (e.g., a cell or tissue sample) using the opto-fluidic instrument and subsequently detected using opto-fluidic instrument (e.g., using detectably labeled primary probes, sequential hybridization of detectable labelled oligonucleotides to primary probes, in situ sequencing (e.g., SBS, SBL, SBH, etc.). In some instances, labelling agents (such as a primary probe set) are added to a biological sample (e.g., a cell or tissue sample) outside the optofluidic instrument and the sample is loaded onto the opto-fluidic instruments disclosed herein for detection (e.g., using sequential hybridization of detectable labelled oligonucleotides), in situ sequencing (e.g., SBS, SBL, SBH, etc.).

In some embodiments, detection of the analytes, probes, probe sets, barcodes, etc. described herein can be performed in situ on the opto-fluidic instruments disclosed herein. In situ sequencing typically involves incorporation of a labeled nucleotide (e.g., fluorescently labeled mononucleotides or dinucleotides) in a sequential, template-dependent manner or hybridization of a labeled primer (e.g., a labeled random hexamer) to a nucleic acid template such that the identities (e.g., nucleotide sequence) of the incorporated nucleotides or labeled primer extension products can be determined, and consequently, the nucleotide sequence of the corresponding template nucleic acid. Aspects of in situ sequencing approaches are described, for example, in Mitra et al., "Fluorescent in situ sequencing on polymerase colonies" *Anal. Biochem.* 320:55-65 (2003), and Lee et al., "Highly Multiplexed Subcellular RNA Sequencing in Situ" *Science,* 343(6177): 1360-1363 (2014). In addition, examples of methods and systems for performing in situ sequencing are described in US 2016/0024555, US 2019/0194709, and in U.S. Pat. Nos. 10,138,509, 10,494,662 and 10,179,932.

In some embodiments, sequencing can be performed by sequencing-by-synthesis (SBS). In some embodiments, a sequencing primer is complementary to sequences at or near the target to be detected (e.g., one or more barcode(s)). In such embodiments, sequencing-by-synthesis can comprise reverse transcription and/or amplification in order to generate a template sequence from which a primer sequence can bind. Exemplary SBS methods comprise those described for example, but not limited to, US 2007/0166705, US 2006/0188901, U.S. Pat. No. 7,057,026, US 2006/0240439, US 2006/0281109, US 2011/0059865, US 2005/0100900, U.S. Pat. No. 9,217,178, US 2009/0118128, US 2012/0270305, US 2013/0260372, and US 2013/0079232.

In some embodiments, sequence analysis of nucleic acids (e.g., nucleic acids such as RCA products comprising barcode sequences) can be performed by sequential hybridization (e.g., sequencing by hybridization and/or sequential in situ fluorescence hybridization). Sequential fluorescence hybridization can involve sequential hybridization of detection probes comprising an oligonucleotide and a detectable label. In some embodiments, a method disclosed herein comprises sequential hybridization of the detectable probes disclosed herein, including detectably labeled probes (e.g., fluorophore conjugated oligonucleotides) and/or probes that are not detectably labeled per se but are capable of binding (e.g., via nucleic acid hybridization) and being detected by detectably labeled probes. Exemplary methods comprising sequential fluorescence hybridization of detectable probes are described in US 2019/0161796, US 2020/0224244, US 2022/0010358, US 2021/0340618, and WO 2021/138676, MERFISH (described for example in Moffitt et. al., "Chapter One—RNA Imaging with Multiplexed Error-Robust Fluorescence In Situ Hybridization (MERFISH)" *Methods in Enzymology,* 572:1-49 (2016)), and hybridization-based in situ sequencing (HybISS) (described for example in Gyllborg et al., "Hybridization-based in situ sequencing (HybISS) for spatially resolved transcriptomics in human and mouse brain tissue," *Nucleic Acids Res* 48(19):e112 (2020)) all of which are incorporated herein by reference.

In some embodiments, sequencing can be performed using sequencing by ligation (SBL). Such techniques utilize DNA ligase to incorporate oligonucleotides and identify the incorporation of such oligonucleotides. The oligonucleotides typically have different labels that are correlated with the identity of a particular nucleotide in a sequence to which the oligonucleotides hybridize. Aspects and features involved in sequencing by ligation are described, for example, in Shendure et al., "Accurate Multiplex Polony Sequencing of an Evolved Bacterial Genome," *Science,* 309:1728-1732 (2005), and in U.S. Pat. Nos. 5,599,675; 5,750,341; 6,969,488; 6,172,218; and 6,306,597. Exemplary techniques for in situ SBL comprise, but are not limited to, STARmap (described for example in Wang et al., "Three-dimensional intact-tissue sequencing of single-cell transcriptional states," *Science,* 361(6499):5691 (2018)) and US 2021/0164039).

In some embodiments, probe barcodes (e.g., plurality of probes or probe sets comprising one or more barcode sequences) or complements or products thereof are targeted by detectably labeled detection oligonucleotides, such as fluorescently labeled oligonucleotides. In some embodiments, one or more decoding schemes (e.g., sequential rounds of fluorescent probe hybridization) are used on the opto-fluidic instruments disclosed herein to decode the signals, such as fluorescence, for sequence identification. In any of the embodiments herein, barcodes (e.g., primary and/or secondary barcode sequences) can be analyzed (e.g., detected or sequenced using the opto-fluidic instruments disclosed herein) using any suitable methods or techniques, comprising those described herein, such as RNA sequential probing of targets (RNA SPOTs), sequential fluorescent in situ hybridization (seqFISH), single-molecule fluorescent in situ hybridization (smFISH), multiplexed error-robust fluorescence in situ hybridization (MERFISH), hybridization-based in situ sequencing (HybISS), in situ sequencing, targeted in situ sequencing, fluorescent in situ sequencing (FISSEQ), or spatially-resolved transcript amplicon readout mapping (STARmap). In some embodiments, the methods provided herein comprise analyzing the barcodes by sequential hybridization and detection with a plurality of labelled probes (e.g., detection oligonucleotides or detectable probes). Exemplary decoding schemes are described in Eng et al., "Transcriptome-scale Super-Resolved Imaging in Tissues by RNA SeqFISH+," *Nature* 568(7751):235-239

(2019); Chen et al., *Science;* 348(6233):aaa6090 (2015); Gyllborg et al., *Nucleic Acids Res* 48(19):e112 (2020); U.S. Pat. No. 10,457,980 B2; US 2016/0369329 A1; WO 2018/026873 A1; and US 2017/0220733 A1, all of which are incorporated by reference in their entirety. In some embodiments, these assays enable signal amplification, combinatorial decoding, and error correction schemes at the same time.

It is to be noted that, although the above discussion relates to an opto-fluidic instrument that can be used for in situ target molecule detection via probe hybridization, the discussion herein equally applies to any opto-fluidic instrument that employs any imaging or target molecule detection technique. That is, for example, an opto-fluidic instrument may include a fluidics module that includes fluids used for establishing the experimental conditions for the probing of target molecules in the sample. Further, such an opto-fluidic instrument may also include a sample module configured to receive the sample, and an optics module including an imaging system for illuminating (e.g., exciting one or more fluorescent probes within the sample) and/or imaging light signals received from the probed sample. The opto-fluidic instrument may also include other ancillary modules configured to facilitate the operation of the opto-fluidic instrument, such as, but not limited to, cooling systems, motion calibration systems, etc.

In various embodiments, as discussed above, any suitable clearing methods may be applied to a sample to prepare the sample for the detection of target molecules therein. Such methods may utilize stripping and/or washing reagents of the fluidics module of the opto-fluidic instrument to resolve the sample and remove macromolecules therefrom. The washing reagents may also be used to optically clear the sample, as discussed above. Examples of washing buffers include but are not limited to deionized water, phosphate-buffered saline (PBS), PBS with dimethyl sulfoxide (DMSO), etc. Examples of stripping buffers include but are not limited to DMSO, a surfactant, etc. For example, the surfactant can be or can include polysorbate 20. In various embodiments, the stripping buffers can include the surfactant in a weight proportion of from about 0.01% to about 5%, from about 0.05% to about 2%, from about 0.1% to about 1%, about 0.1%, less than 1%, including value and subranges therebetween.

The stripping and/or washing reagents may be stored in bottles in the fluidics module of the opto-fluidic instrument, and the bottles may be fluidically connected to the sample module of the opto-fluidic instrument for preparing and processing a sample at the sample module for target molecule identification. The present disclosure discusses systems for interfacing with a bottle, and in particular, assemblies configured to seal a bottle and provide a fluidic path between the interior of the bottle and its exterior that allow reagents to be drawn from the bottle.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

II. Example Descriptions of Terms

As used herein the specification, "a" or "an" may mean one or more. As used herein in the claim(s), when used in conjunction with the word "comprising," the words "a" or "an" may mean one or more than one. Some embodiments of the disclosure may consist of or consist essentially of one or more elements, method steps, and/or methods of the disclosure. It is contemplated that any method or composition described herein can be implemented with respect to any other method or composition described herein and that different embodiments may be combined.

As used herein, "substantially" means sufficient to work for the intended purpose. The term "substantially" thus allows for minor, insignificant variations from an absolute or perfect state, dimension, measurement, result, etc. such as would be expected by a person of ordinary skill in the field but that do not appreciably affect overall performance. When used with respect to numerical values or parameters or characteristics that can be expressed as numerical values, "substantially" means within ten percent.

The use of the term "or" in the claims is used to mean "and/or" unless explicitly indicated to refer to alternatives only or the alternatives are mutually exclusive, although the disclosure supports a definition that refers to only alternatives and "and/or." For example, "x, y, and/or z" can refer to "x" alone, "y" alone, "z" alone, "x, y, and z," "(x and y) or z," "x or (y and z)," or "x or y or z." It is specifically contemplated that x, y, or z may be specifically excluded from an embodiment. As used herein "another" may mean at least a second or more.

The term "ones" means more than one.

As used herein, the term "plurality" can be 2, 3, 4, 5, 6, 7, 8, 9, 10, or more.

As used herein, the term "set of" means one or more. For example, a set of items includes one or more items.

As used herein, the phrase "at least one of," when used with a list of items, means different combinations of one or more of the listed items may be used and only one of the items in the list may be needed. The item may be a particular object, thing, step, operation, process, or category. In other words, "at least one of" means any combination of items or number of items may be used from the list, but not all of the items in the list may be required. For example, without limitation, "at least one of item A, item B, or item C" means item A; item A and item B; item B; item A, item B, and item C; item B and item C; or item A and C. In some cases, "at least one of item A, item B, or item C" means, but is not limited to, two of item A, one of item B, and ten of item C; four of item B and seven of item C; or some other suitable combination As used herein, the term "about" refers to include the usual error range for the respective value readily known. Reference to "about" a value or parameter herein includes (and describes) embodiments that are directed to that value or parameter per se. For example, description referring to "about X" includes description of "X". In some embodiments, "about" may refer to +15%, +10%, +5%, or +1% as understood by a person of skill in the art.

As used herein, the term "fluidic connection", or variants thereof, refer to the connection of two or more components by tubes that allow fluids to flow therein from one of the two or more components to another. The fluid flow can be uni-directional or bi-directional.

While the present teachings are described in conjunction with various embodiments, it is not intended that the present teachings be limited to such various embodiments. On the contrary, the present teachings encompass various alternatives, modifications, and equivalents, as will be appreciated by those of skill in the art.

In describing the various embodiments, the specification may have presented a method and/or process as a particular sequence of steps. However, to the extent that the method or process does not rely on the particular order of steps set forth herein, the method or process should not be limited to the particular sequence of steps described, and one skilled in the art can readily appreciate that the sequences may be varied and still remain within the spirit and scope of the various embodiments.

III. Opto-Fluidic Instrument for Analysis of Biological Samples

FIG. 1 shows an example workflow of analysis of a biological sample 110 (e.g., cell or tissue sample) using an opto-fluidic instrument 120, according to various embodiments. In various embodiments, the sample 110 can be a biological sample (e.g., a tissue) that includes molecules targeted for analysis (i.e., target molecules), such as DNA, RNA, proteins, antibodies, etc. In various embodiments, the biological sample is a fresh frozen tissue. In various embodiments, the biological sample is a formalin-fixed paraffin-embedded (FFPE) sample. For example, the sample 110 can be a sectioned tissue that is treated to access the RNA thereof for labeling with circularizable DNA probes. In various embodiments, ligation of the probes generates a circular DNA probe which can be enzymatically amplified and bound with fluorescent oligonucleotides to produce a sufficiently bright signal that facilitates image acquisition and has a high signal-to-noise ratio.

In various embodiments, the sample 110 may be placed in the opto-fluidic instrument 120 for analysis and detection of the target molecules in the sample 110. In various embodiments, the opto-fluidic instrument 120 is configured to facilitate the experimental conditions conducive for the detection of the target molecules. For example, the opto-fluidic instrument 120 can include a fluidics module 140, an optics module 150, a sample module 160, and at least one ancillary module 170, and these modules may be operated by a system controller 130 to create the experimental conditions for the probing of the target molecules in the sample 110 by selected probes (e.g., circularizable DNA probes), as well as to facilitate the imaging of the probed sample 110 (e.g., by an imaging system of the optics module 150). In various embodiments, the various modules of the opto-fluidic instrument 120 may be separate components. In various embodiments, the various modules of the opto-fluid instrument may be in electrical communication with each other. In various embodiments, at least some of the modules of the opto-fluidic instrument 120 may be integrated together into a single module.

In various embodiments, the sample module 160 may be configured to receive the sample 110 in the opto-fluidic instrument 120. For instance, the sample module 160 may include a sample interface module (SIM) that is configured to receive a sample device (e.g., cassette) in which a substrate (having the sample 110 positioned thereon) can be secured. In various embodiments, the substrate is a glass slide. That is, the sample 110 may be placed in the opto-fluidic instrument 120 by securing the substrate having the sample 110 (e.g., the sectioned tissue) within the sample device that is then inserted into the SIM of the sample module 160. In various embodiments, the SIM includes an alignment mechanism configured to secure the sample device within the SIM and align the sample device in X, Y, and Z axes within the SIM. In some instances, the sample module 160 may also include an X-Y stage onto which the SIM is mounted. The X-Y stage may be configured to move the SIM mounted thereon (e.g., and as such the sample device containing the sample 110 inserted therein) in perpendicular directions along a two-dimensional (2D) plane of the opto-fluidic instrument 120. Additional discussion related to the SIM can be found in U.S. application Ser. No. 18/328,200, filed Jun. 2, 2023, titled "Methods, Systems, and Devices for Sample Interface," which is incorporated herein by reference in its entirety.

The experimental conditions that are conducive for the detection of the target molecules in the sample 110 may depend on the target molecule detection technique that is employed by the opto-fluidic instrument 120. For example, in various embodiments, the opto-fluidic instrument 120 can be a system that is configured to detect molecules in the sample 110 via hybridization of probes. In such cases, the experimental conditions can include molecule hybridization conditions that result in the intensity of hybridization of the target molecule (e.g., nucleic acid) to a probe (e.g., oligonucleotide) being significantly higher when the probe sequence is complementary to the target molecule than when there is a single-base mismatch. The hybridization conditions include the preparation of the sample 110 using reagents such as washing/stripping reagents, probe reagents, etc., and such reagents may be provided by the fluidics module 140. Examples of the washing buffer include but are not limited to deionized water, phosphate-buffered saline (PBS), PBS with dimethyl sulfoxide (DMSO), etc. The stripping buffer can be but is not limited to DMSO, a surfactant, etc. In some instances, the surfactant can be or include polysorbate 20. In some instances, the stripping buffer may include the surfactant in a weight proportion of about 0.1%. The probe reagent can be fluorescent probes, such as but not limited to oligonucleotide probes.

In various embodiments, the fluidics module 140 may include one or more components that may be used for storing the reagents, as well as for transporting said reagents to and from the sample device containing the sample 110. For example, the fluidics module 140 may include one or more reservoirs or reagent bottles configured to store the reagents, as well as a waste container configured for collecting the reagents (e.g., and other waste) after use by the opto-fluidic instrument 120 to analyze and detect the molecules of the sample 110. In various embodiments, the one or more reservoirs include one or more high use reagent reservoirs. In various embodiments, the fluidics module 140 may be configured to receive one or more low use reagent plates (e.g., a 96 deep well plate).

Further, the fluidics module 140 may also include pumps, tubes, pipettes, etc., that are configured to facilitate the transport of the one or more reagents (such non-limiting examples may include high use reagent and/or low use reagent) to the sample device and thus contact the sample 110 with the reagent (such non-limiting examples may include high use reagent and/or low use reagent). For instance, the fluidics module 140 may include one or more pumps ("reagent pumps") that are configured to pump washing and/or stripping reagents (i.e., high use reagents) to the sample device for use in washing and/or stripping the sample 110. In various embodiments, the fluidics module 140 may be configured for other washing functions such as washing an objective lens of the imaging system of the optics module 150). In some embodiments, a stage (e.g., a Y-Z stage) may be configured to move the pipettes, tubes, etc., along one or more directions, to and from the sample device containing the sample 110, so that the various reagents may be dispensed in the sample device, and spent reagents may be extracted from the sample device.

In various embodiments, the ancillary module 170 includes a cooling system (i.e., a heat transfer system) of the opto-fluidic instrument 120. In various embodiments, the cooling system includes a network of coolant-carrying tubes configured to transport coolant to various modules of the opto-fluidic instrument 120 for regulating the temperatures thereof. In such cases, the ancillary module 170 may include one or more heat transfer components of a heat transfer circuit. In various embodiments, the heat transfer components include one or more coolant reservoirs for storing coolants and pumps (e.g., "coolant pumps") for generating a pressure differential, thereby forcing the coolants to flow from the reservoirs to the various modules of the opto-fluidic instrument 120 via the coolant-carrying tubes. In some instances, the heat transfer components of the ancillary module 170 may include returning coolant reservoirs that may be configured to receive and store returning coolants, i.e., heated coolants flowing back into the returning coolant reservoirs after absorbing heat discharged by the various modules of the opto-fluidic instrument 120. In such cases, the ancillary module 170 may also include one or more cooling fans that are configured to force air (e.g., cool and/or ambient air) to the external surfaces of the returning coolant reservoirs to thereby cool the heated coolant(s) stored therein. In some instance, the ancillary module 170 may also include one or more cooling fans that are configured to force air directly to one or more components of the opto-fluidic instrument 120 so as to cool said one or more components. For one non-limiting example, the ancillary module 170 may include cooling fans that are configured to directly cool by forcing ambient air past the system controller 130 to thereby cool the system controller 130.

As discussed above, the opto-fluidic instrument 120 may include an optics module 150 which include the various optical components of the opto-fluidic instrument 120, such as but not limited to a camera, an illumination module (such non-limiting examples may include one or more LEDs and/or one or more lasers), an objective lens, and/or the like. The optics module 150 may include a fluorescence imaging system that is configured to image the fluorescence emitted by the probes (e.g., oligonucleotides) in the sample 110 after the probes are excited by light from the illumination module of the optics module 150.

In various embodiments, the system controller 130 may be configured to control the operations of the opto-fluidic instrument 120 (e.g., and the operations of one or more modules thereof). In some embodiments, the system controller 130 may take various forms, including a processor, a single computer (or computer system), or multiple computers in communication with each other. In various embodiments, the system controller 130 may be communicatively coupled with a data storage, a set of input devices, display system, or a combination thereof. In various embodiments, some or all of these components may be considered to be part of or otherwise integrated with the system controller 130, may be separate components in communication with each other, or may be integrated together. In other embodiments, the system controller 130 can be, or may be in communication with, a cloud computing platform.

In various embodiments, the opto-fluidic instrument 120 may analyze the sample 110 and generate the output 190 that includes indications of the presence of the target molecules in the sample 110. For instance, with respect to the example embodiment discussed above where the opto-fluidic instrument 120 employs a hybridization technique for detecting molecules, the opto-fluidic instrument 120 may perform a plurality of probing rounds on the sample 110. During the plurality of probing rounds, the sample 110 undergoes successive rounds of fluorescent probe hybridization (using two or more sets of fluorescent probes, where each set of fluorescent probes is excited by a different color channel) and is volumetrically imaged in a plurality of z-stacks to detect target molecules in the probed sample 110 in three dimensions. In such cases, the output 190 may include a plurality of light signals at specific three-dimensional locations over the plurality of probing cycles. In various embodiments, an optical signature (e.g., a codeword) specific to each gene is determined from the detected optical signals at each three-dimensional location across the plurality of probing cycles, which allows the identification of the target molecules.

IV. An Assembly for Interfacing with Reagent Bottles

As noted above, the stripping and/or washing reagents that are used to prepare a sample for target molecule identification may be stored in bottles in the fluidics module of an opto-fluidic instrument, where non-limiting example of such sample, fluidics module, and opto-fluidic instrument are sample 110, fluidics module 140, and optofluidic instrument 120 of FIG. 1. In various embodiments, a bottle interface assembly may be utilized to seal the bottle and provide a fluid path between the interior of the fluid and the exterior such that the bottle (e.g., and the reagents stored therein) may be fluidically connected to the sample module, of which one non-limiting example may be sample module 160 of FIG. 1, of the opto-fluidic instrument, of which one non-limiting example is opto-fluidic instrument 120 of FIG. 1. In various embodiments, FIG. 2 and FIG. 3 show non-limiting example illustrations of a bottle interface assembly engaged with a capped bottle, and the bottle interface assembly disengaged from the capped bottle, respectively.

Figure 2:
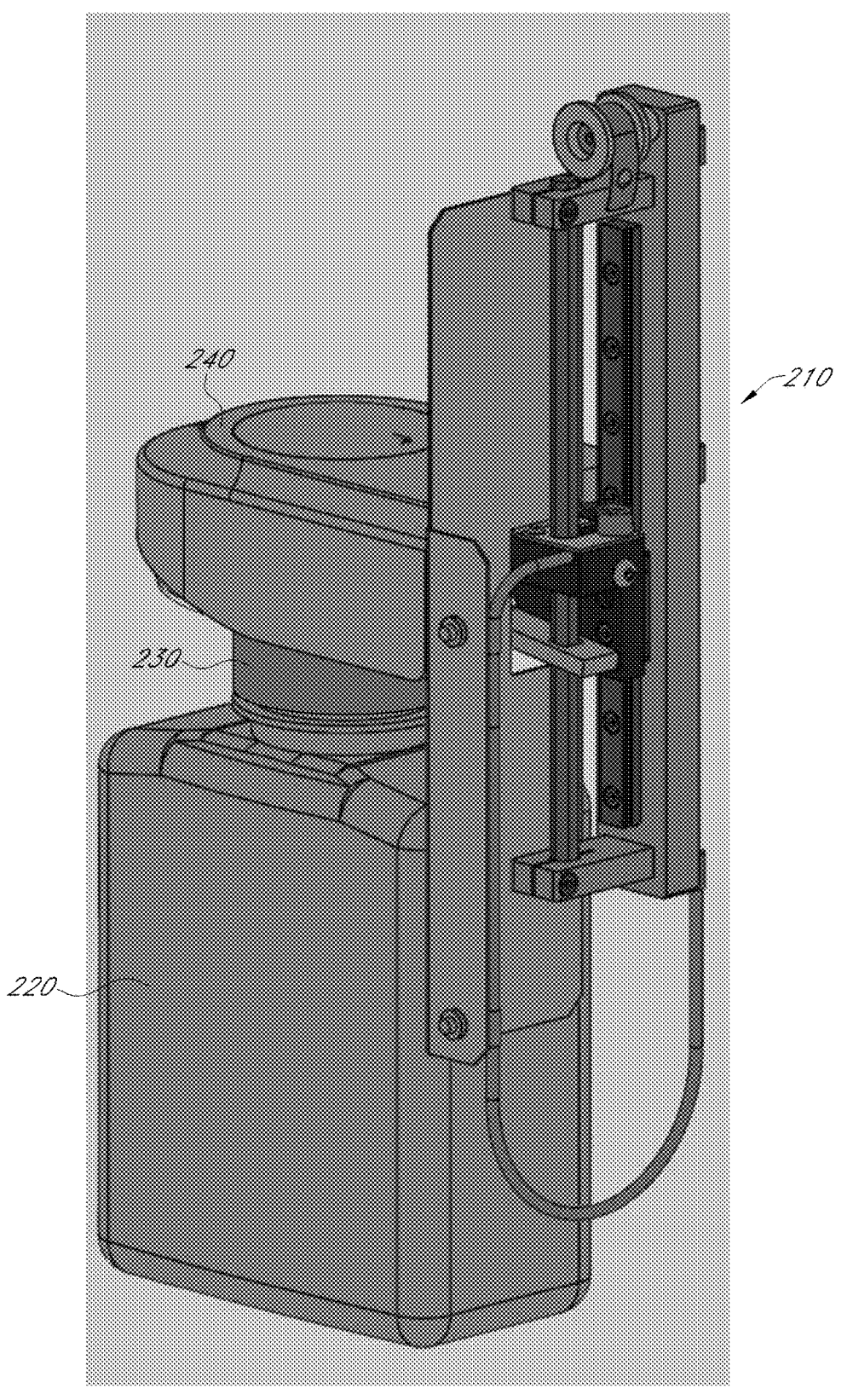
FIG. 2 illustrates a bottle interface assembly engaged with a capped bottle, according to various embodiments.
Figure 3:
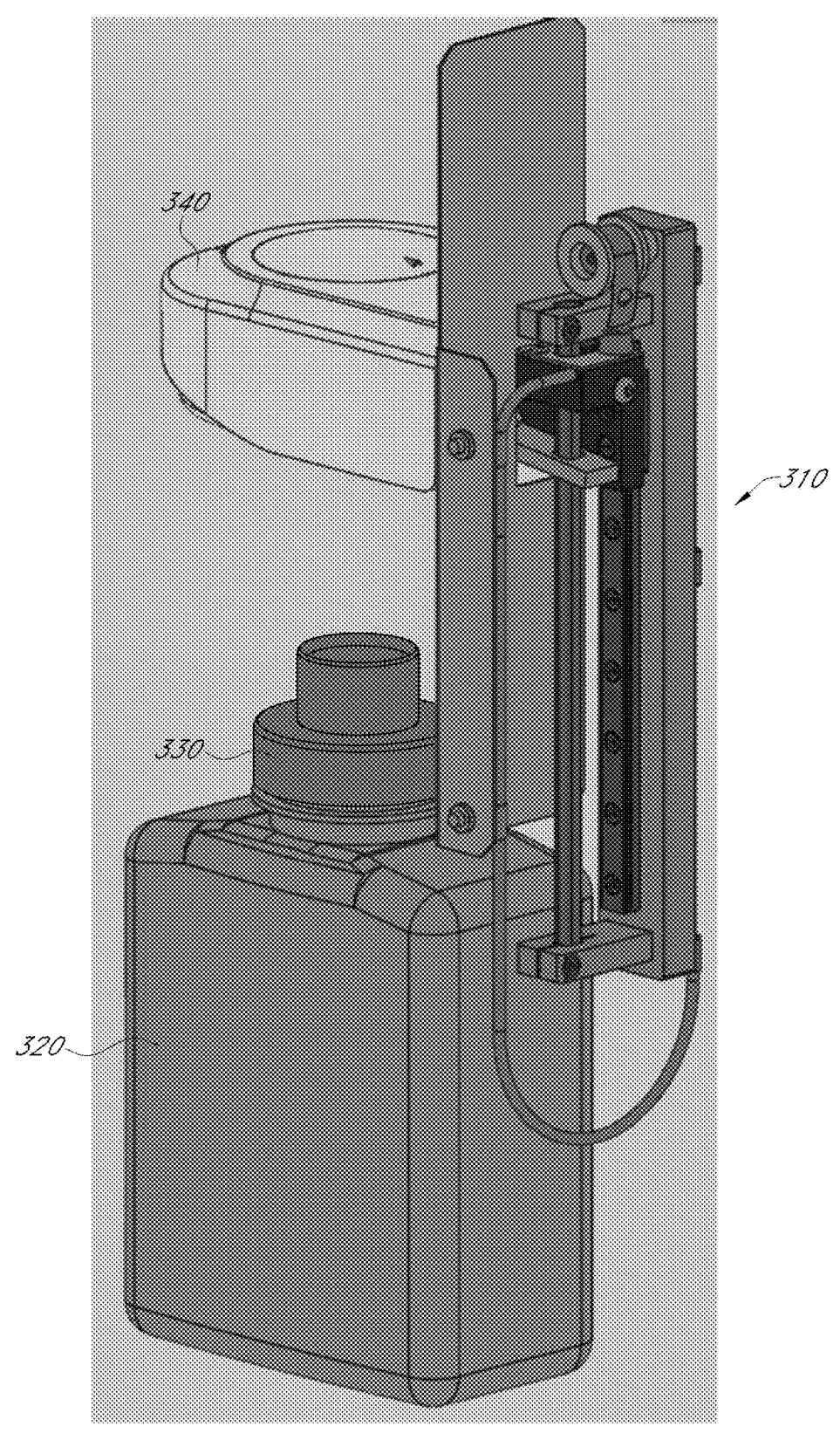
FIG. 3 illustrates a bottle interface assembly disengaged from a capped bottle, according to various embodiments.

In various embodiments, with reference to FIG. 2, a bottle 220 for storing fluids (e.g., washing reagents, stripping reagents, etc.) may be capped with a bottle cap 230. In various embodiments, a bottle interface assembly 240 may be configured to engage with the bottle cap 230 to connect the bottle 220 and provide a fluid path between the interior of the bottle 220 and the exterior thereof (e.g., the fluidics module of the opto-fluidic instrument) to facilitate the drawing out of the reagents stored therein. The bottle interface assembly 240 may have a locking mechanism therein that is configured to lock or unlock the bottle interface assembly 240 when the bottle interface assembly 240 is in its resting or actuated configuration, respectively. That is, the bottle interface assembly 240 may have a resting configuration which is characterized by the locking mechanism locking the bottle interface assembly 240 in place on an assembly support structure 210 to limit or prevent the movement of the bottle interface assembly 240 along the assembly support structure 210. The assembly support structure 210 may be configured to support the bottle interface assembly 240 and facilitate the vertical movement of the bottle interface assembly 240 above the bottle 220 (e.g., which is capped by the bottle cap 230). In various embodiments, the bottle interface assembly 240 may have an actuated configuration which is characterized by the locking mechanism unlocking the bottle interface assembly 240 from the assembly support structure 210 to allow the movement of the bottle interface assembly 240 along the assembly support structure 210. When sealing the bottle 220 that is capped with the bottle cap 230, in various embodiments, the bottle interface assembly 240 may be engaged with the capped bottle 220, while it is in its resting configuration and locked to the assembly support structure 210 by the locking mechanism.

The bottle interface assembly 240 can be disengaged from the bottle cap 230 by actuating the locked bottle interface assembly 240, i.e., by unlocking the locking mechanism, and moving the bottle interface assembly 240 away from the bottle cap 230 while the bottle interface assembly 240 is still in its actuated configuration (i.e., while the locking mechanism is unlocked). FIG. 3 shows a general non-limiting example of an illustration of a bottle interface assembly from a first position (engaged to the bottle cap 230) in FIG. 2 to a second position in FIG. 3 (disengaged from the bottle cap 330). The bottle interface assembly 340 that is disengaged and removed from a bottle cap 330, in various embodiments. To transition the bottle interface assembly 340 from its first position in FIG. 2 where the bottle interface assembly 240 is engaged with (e.g., and sealing) the bottle cap 230 to the state in FIG. 3 where the bottle interface assembly 340 is disengaged and distanced from the bottle cap 330, in various embodiments, the bottle interface assembly 340 may be unlocked (e.g., placed in the actuated configuration) and translated vertically along the assembly support structure 310. The upward movement of the bottle interface assembly 240, 340 may be effected by the assembly support structure 310 that is configured to apply upward force on the bottle interface assembly 340 thereby causing the bottle interface assembly 340 to move vertically upward when it is in its actuated configuration. The bottle interface assembly 340 may subsequently be returned to its resting configuration (where the locking mechanism locks the bottle interface assembly 340) where motion of the bottle interface assembly is limited (e.g., prevented) relative to the assembly support structure 310 (e.g., until the locking mechanism is again actuated to allow the bottle interface assembly 340 to move along the assembly support structure 310 (e.g., down towards the bottle 320)). A non-limiting example of the locking mechanism is discussed in more detail with reference to FIGS. 6A-6C.

Figure 4:
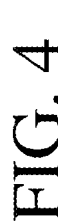
FIG. 4 illustrates a cross-sectional view of a bottle interface assembly coupled with a straight shaft of an assembly support structure, according to various embodiments.
Figure 4:
Figure 5A:
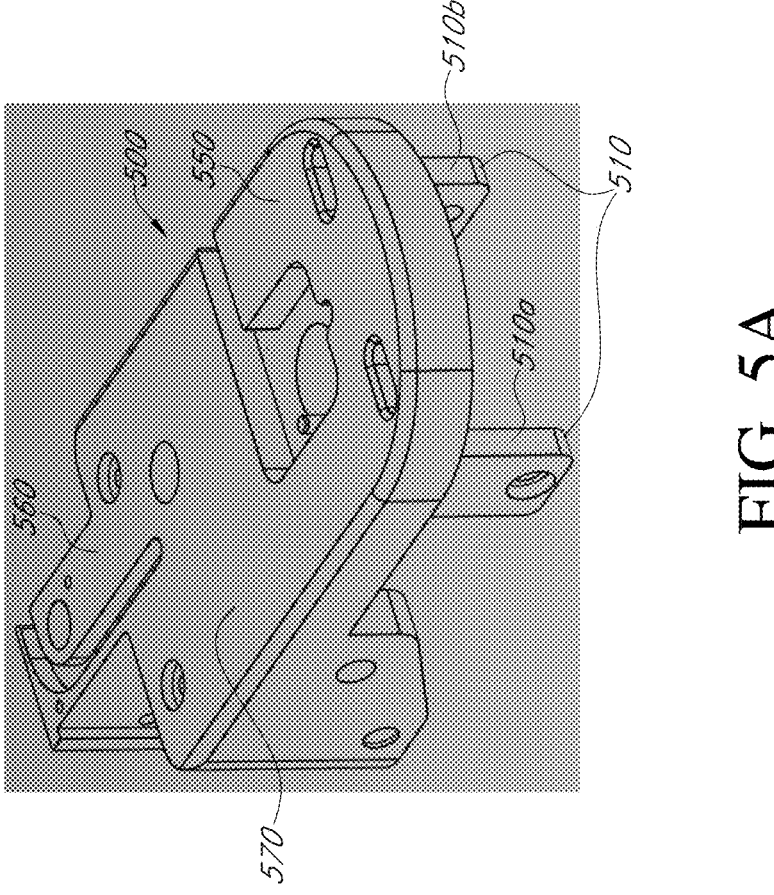
FIGS. 5A-5C illustrates multiple views of the base of a bottle interface assembly, according to various embodiments.
Figure 5B:
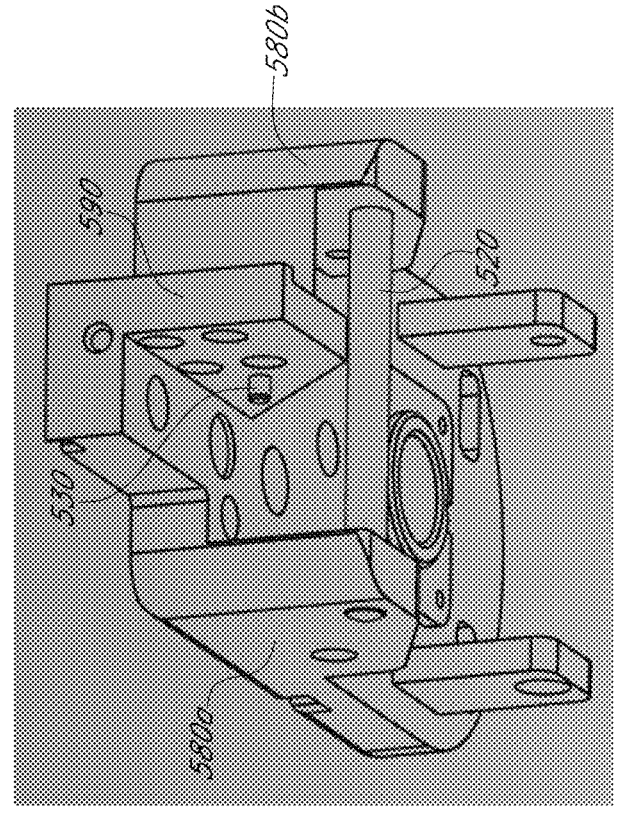
Figure 5C:
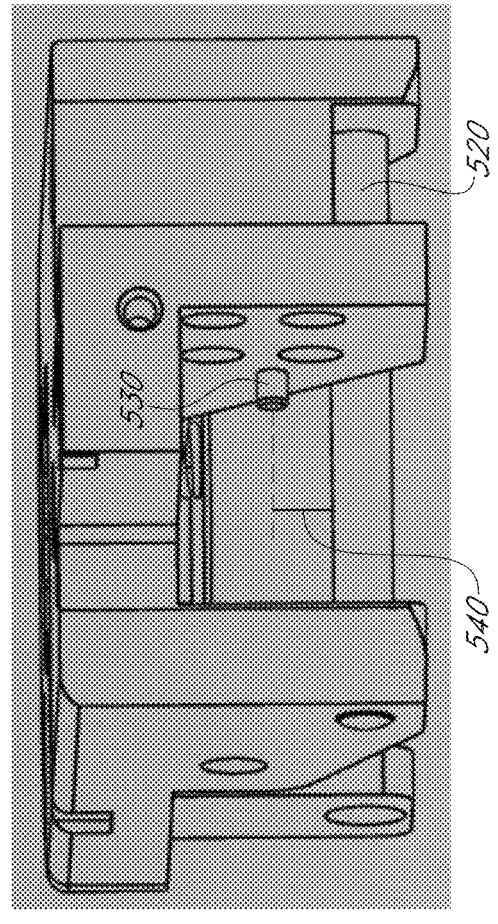

FIG. 4 shows a cross-sectional view of the bottle interface assembly 400 coupled with a straight shaft 450 of the assembly support structure, in various embodiments. In various embodiments, the bottle interface assembly 400 may include a base 410 having a platform and one or more projections projecting at least substantially perpendicularly therefrom. For example, as shown in FIGS. 5A-5C, the base 500 (which is a non-limiting example of the base 410 in FIG. 4) includes a platform 570 and a pair of projections 510a, 510b (collectively referred to as 510 as labeled in FIG. 5A). In other non-limiting examples, the base 500 may include one, three, four, five, etc., projections 510. In various embodiments, the platform 570 of the base 500 may have a distal end 550 and a proximal end 560, where the distal end 550 is the end of the base 500 or the platform 570 that is furthest from the assembly support structure (of which one non-limiting example is shaft 450 of FIG. 4) and the proximal end 560 is the end of the base 500 or the platform 570 that is closest to the assembly support structure (of which one non-limiting example is shaft 450 of FIG. 4). In such cases, the projections 510 of the base 500 may be projections extending from the distal end 550 of the platform 570 of the base 500 in an at least substantially perpendicular direction to the plane of the platform 570. In various embodiments, the projections 510 may be recessed from the edge of the platform (as shown in FIG. 5B). The projections

510 may extend from the distal end 550 of the base 500 in any desired manner. For example, a pair of the projections 510a, 510b may extend from the distal end 550 of the platform 570 parallel to each other (e.g., and at least substantially perpendicular to the plane of the platform 570).

In various embodiments, FIG. 5 in a non-limiting example relates that the base 500 may have shanks 580a, 580b that extend from the platform 570 of the base. In various embodiments, the shanks 580a, 580b may extend at least substantially perpendicularly from the distal end 550 of the platform 570 of the base 500. For instance, the shanks 580a, 580b may extend from the edge of the platform 570. In various embodiments, the shanks 580a, 580b may extend from the platform 570 at least substantially parallel to the projections 510a, 510b. The base 500 may have multiple shanks 580a, 580b, and at least two of these shanks 580a, 580b may be extended from opposite ends of the distal end 550 of the platform 570 parallel to each other. In such cases, the base 500 may include a pivot bar 520 that extends between the pair of shanks 580a, 580b that are parallel to each other. In some embodiments, the pivot bar 520 may extend between one of the shanks 580a, 580b and a proximal end part 590 of the proximal end 560 of the base 500 (e.g., instead of extending between the pair of shanks 580a, 580b). In any case, the pivot bar 520 may be at least substantially parallel to the plane of the platform 570. The pivot bar 520 may be configured to support a brake bar of the bottle interface assembly at a fulcrum, where non-limiting example of a brake bar, bottle interface assembly, and fulcrum, may be a brake bar 440, bottle interface assembly 400, fulcrum 490 respectively in FIG. 4. Such a pivot bar 520 will allow the brake bar 440 to seesaw about this fulcrum 490 as the bottle interface assembly 400 shifts between its resting and actuated configuration, as discussed in more details below.

In various embodiments, one of the shanks 580a, 580b, or the proximal end part 590 may include a stopper 530 protruding therefrom. The stopper 530 may protrude or extend in the same direction as the length of the pivot bar 520 (e.g., in the direction that the pivot bar 520 extends). In various embodiments, the stopper 530 may be displaced with respect to the pivot bar 520 in the other two directions of the 3D reference frame of the base 500. In some embodiments, the 3D reference frame may be defined as an expansion of the 2D xy-plane of the platform 570 along both vertical z-directions perpendicular to the 2D xy-plane. The stopper 530 may be located on one of the shanks 580a, 580b, or the proximal end part 590 such that it is positioned away from the pivot bar 520 in the vertical z-direction, and at least in one of the x- or y-directions. For example, FIG. 5C shows a stopper 530 that is positioned away from pivot bar 540 in the z-direction by a z-displacement 540. In various embodiments, if the pivot bar 520 extends in the x- or y-direction (e.g., and as such the stopper 530 protrudes or extends in the same direction), the stopper 530 may be positioned in the y- or x-direction, respectively, with respect to the pivot bar 520. For example, the stopper may extend into the path of rotation and/or pivoting of the brake bar, so as to stop the brake bar from rotating and/or pivoting beyond a certain point.

In various embodiments, the positioning of the stopper 530 with respect to the pivot bar 520 may be configured to allow the brake bar, (where one non-limiting example of such a brake bar is break bar 440 of FIG. 4) to maintain a predetermined angle (e.g., non-perpendicular or substantially perpendicular angle) with the shaft (where one non-limiting example of such a shaft is shaft 450 of FIG. 4) when the bottle interface assembly, (where one non-limiting example of such a bottle interface assembly is bottle interface assembly 400 of FIG. 4) is in its resting or actuated configuration, respectively. For example, the z-displacement 540 may be at least large enough to allow a brake bar 440 to pass between the pivot bar 520 and the stopper 530. In various embodiments, the z-displacement 540 and/or the displacement in the x- or y-direction may be configured to allow the brake bar 440 maintain a non-perpendicular angle with the shaft 450 when the bottle interface assembly 400 is in a resting configuration, and/or a non-perpendicular angle with the shaft 450 when the bottle interface assembly is in the actuated configuration, as discussed in more details below with non-limiting example reference to FIGS. 6A-6C. For example, in some embodiments, the brake bar 440 can rest on the pivot bar 520, and the brake bar 440 may be kept in a locked state (e.g., via at least one spring) until a human hand presses release lever 620*b* towards 625, causing the brake bar to disengage (e.g., by causing the brake bar to become horizontal and causing the pivot bar 520 to move freely through the brake bar 440).

In various embodiments relating to FIG. 4, the bottle interface assembly 400 includes a release lever 420 that can be utilized to switch between its resting and actuated configurations. The release lever 420 may include a first lever section 420*a* and a second lever section 420*b*, and the release lever 420 may be rotatably hinged to the base 410 at the first lever section 420*a*. For example, the release lever 420 may be positioned under the base 410, and the second lever section 420*b* may be configured to rotate towards and away from the distal end of the base 410 (distal to the shaft 450, for example) about the hinge point(s) of the first lever section 420*a* to the base 410. The motion of the second lever section 420*b* towards or away from the distal end of the base 410 may result in the bottle interface assembly 400 switching between its resting and actuated configurations. The afore-mentioned locking mechanism that locks the bottle interface assembly 400 in its resting configuration, or unlocks it to allow the bottle interface assembly 400 to translate (e.g., vertically) its actuated configuration, is illustrated in more details below with non-limiting reference to FIGS. 6A-6C.

Figure 6A:
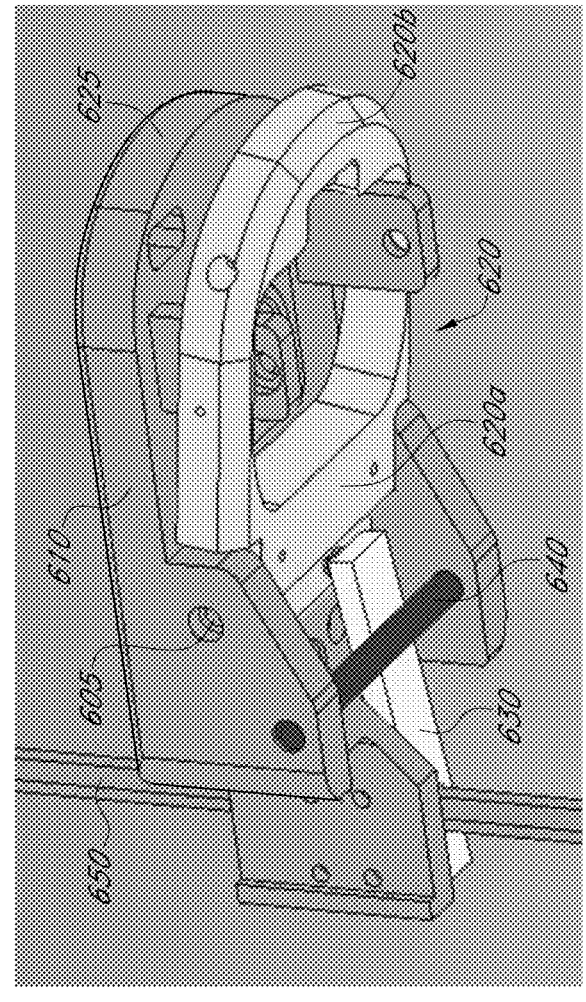
FIGS. 6A-6C illustrates a locking mechanism that includes a base, release lever, and brake bar, of a bottle interface assembly, that is configured to lock the bottle interface assembly in place at a straight shaft extending through the brake bar, according to various embodiments.
Figure 6B:
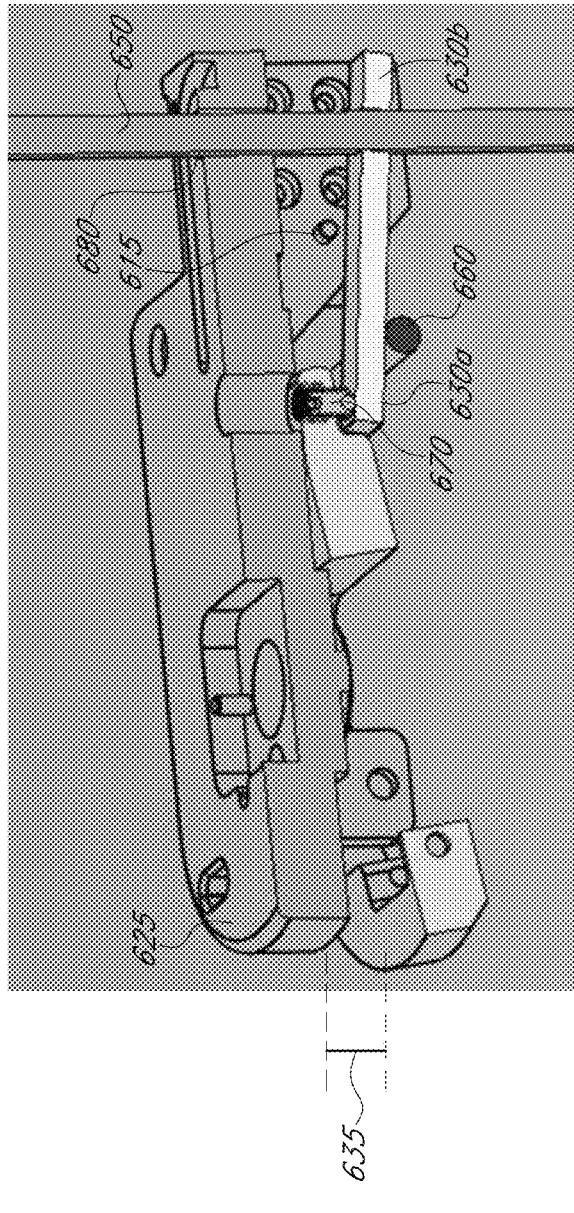

FIG. 6A shows the base 610, the release lever 620, the brake bar 630, the pivot bar 640, and the straight shaft 650 when a bottle interface assembly (of which one non-limiting bottle interface assembly reference is bottle interface assembly 400 of FIG. 4) that includes the base 610, the release lever 620, the brake bar 630, etc., is in its resting configuration, in various embodiments. FIG. 6B shows a cross-section of the configuration shown in FIG. 6A. As shown, the release lever 620, which may include a first lever section 620*a* and a second lever section 620*b*, may be positioned underneath the base 610 and may be rotatably hinged to the base 610 at a hinge point(s) 605 that is located at the first lever section 620*a* of the release lever 620. The brake bar 630, which may include a first bar section 630*a* and a second bar section 630*b*, may also be positioned underneath the base 610, and may be coupled to the release lever 620 at a coupling point via a coupling mechanism 670. For example, the first bar section 630*a* of the brake bar 630 may be coupled to the first lever section 620*a* of the release lever 620 at the coupling point via a coupling mechanism 670, for example, a ball point screw.

In various embodiments, the other end of the brake bar 630, i.e., the second bar section 630*b*, may include a bore 680 through which the straight shaft 650 extends. In some instances, the base 610 may also include a bore 680 formed the proximal end 560, and the shaft 650 may also extend through the bore 680. In various embodiments, the pivot bar 640 is positioned under the brake bar 630 and may be configured to provide support to the brake bar 630. In various embodiments, the pivot bar 640 may be positioned underneath the base 610 at a location that is in between the coupling mechanism 670 and the bore 680. That is, the fulcrum 660 may be located along the brake bar 630 between the coupling mechanism 670 and the bore 680.

Figure 6C:
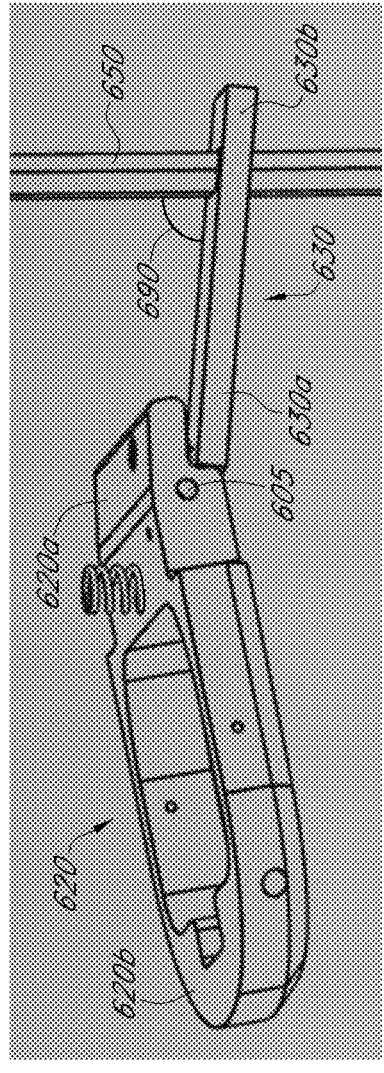

In various embodiments, the stopper 615 is positioned on the base 610 (e.g., on shanks of the base 610, such non-limiting example of such shanks include shanks 580*a*, 580*b* of FIG. 5B) with respect to the pivot bar 640 such that the brake bar 630 may extend between pivot bar 640 and the stopper 615 while forming an angle 690 with the straight shaft 650, as shown in FIG. 6C. The angle 690 can have values in the range from about 70° to about 90°, from about 75° to about 90°, from about 85° to about 90°, including values and subranges therebetween. For instance, when the bottle interface assembly is in its resting configuration (e.g., as shown in FIGS. 6A-6C), the angle 690 may be non-perpendicular (e.g., in the range from about 70° to about 85°.) When in the actuated configuration, the angle 690 can be substantially perpendicular. In various embodiments, the vertical (e.g., z-direction in the afore-defined 3D reference frame) distance between the stopper 615 and the pivot bar 640 may be greater than the linear dimension of the brake bar 630 in the same direction. In such cases, the brake bar 630 may be capable of translating and/or rotating between the stopper 615 and the pivot bar 640 as well as changing the angle 690 (e.g., from non-perpendicular to perpendicular, and vice versa).

As noted above, the resting configuration of the bottle interface assembly that includes the base 610, the release lever 620, the brake bar 630, etc., is shown in FIGS. 6A-6C, where the second lever section 620*b* of the release lever 620 is displaced by a distance 635 with respect to distal end 625 of the base 610, while it is rotatably hinged to the base 610 at the hinge point(s) 605 located at the first lever section 620*a* of the release lever 620. In various embodiments, the brake bar 630 forms an angle 690, that is non-perpendicular, with the straight shaft 650 to limit or prevent a relative motion between the brake bar 630 and the straight shaft 650. That is, when the bottle interface assembly in the resting configuration, the angle 690 between the brake bar 630 and the straight shaft 650 may be non-perpendicular, thereby limiting or preventing the brake bar 630 from sliding along the shaft 650 (e.g., and as such maintaining the bottle interface assembly in the resting configuration).

In various embodiments, the bottle interface assembly may be actuated, i.e., its configuration may be changed from resting to actuated configuration, by pressing the second lever section 620*b* towards the distal end 625 of the base 610 thereby reducing the distance 635 between the second lever section 620*b* and the distal end 625 of the base 610. In such cases, upon the second lever section 620*b* being pressed towards the distal end 625 of the base 610, the coupling between the release lever 620 and the brake bar 630 at the coupling point 670 may apply a downward force at the first bar section 630*a* of the brake bar 630. That is, for example, a coupling mechanism 670 (e.g., ball point screw) positioned at the coupling point may apply a downward force on the first bar section 630*a* of the brake bar 630.

In various embodiments, the downward force on the first bar section 630*a* may cause the first bar section 630*a* and the second bar section 630*b* to perform a translation along and/or rotation about the fulcrum 660, allowing the brake bar 630 to form a substantially perpendicular angle with the straight shaft 650. That is, when the first bar section 630*a* is pushed down by the downward force such that the angle 690 becomes a substantially perpendicular angle, the second bar section 630*b* becomes capable of sliding vertically (e.g., upwards) along the straight shaft 650. The upward movement of the second bar section 630*b* along the shaft 650, however, is limited by the stopper 615. That is, the stopper 615 may limit or prevent the second bar section 630*b* from sliding up the shaft 650 to an extent that the angle 690 exceeds about 90°. In other words, the stopper 615 is configured to aid the brake bar 630 to maintain the substantially perpendicular angle when the bottle interface assembly is in the actuated configuration. The pivot bar 640 may also be configured to aid the brake bar 630 to maintain the substantially perpendicular angle when the assembly is in the actuated configuration as the pivot bar 640 provides upward support to the brake bar 630 when the brake bar 630 at a substantially perpendicular angle with the straight shaft 650. In various embodiments, the brake bar and shaft are configured to allow translation of the bottle interface assembly in one direction (e.g., vertically down the shaft) in both the resting and actuated configurations of the bottle interface assembly, while allowing translation of the bottle interface assembly in the other direction (e.g., vertically up the shaft) in only the actuated configurations of the bottle interface assembly.

Figure 7A:
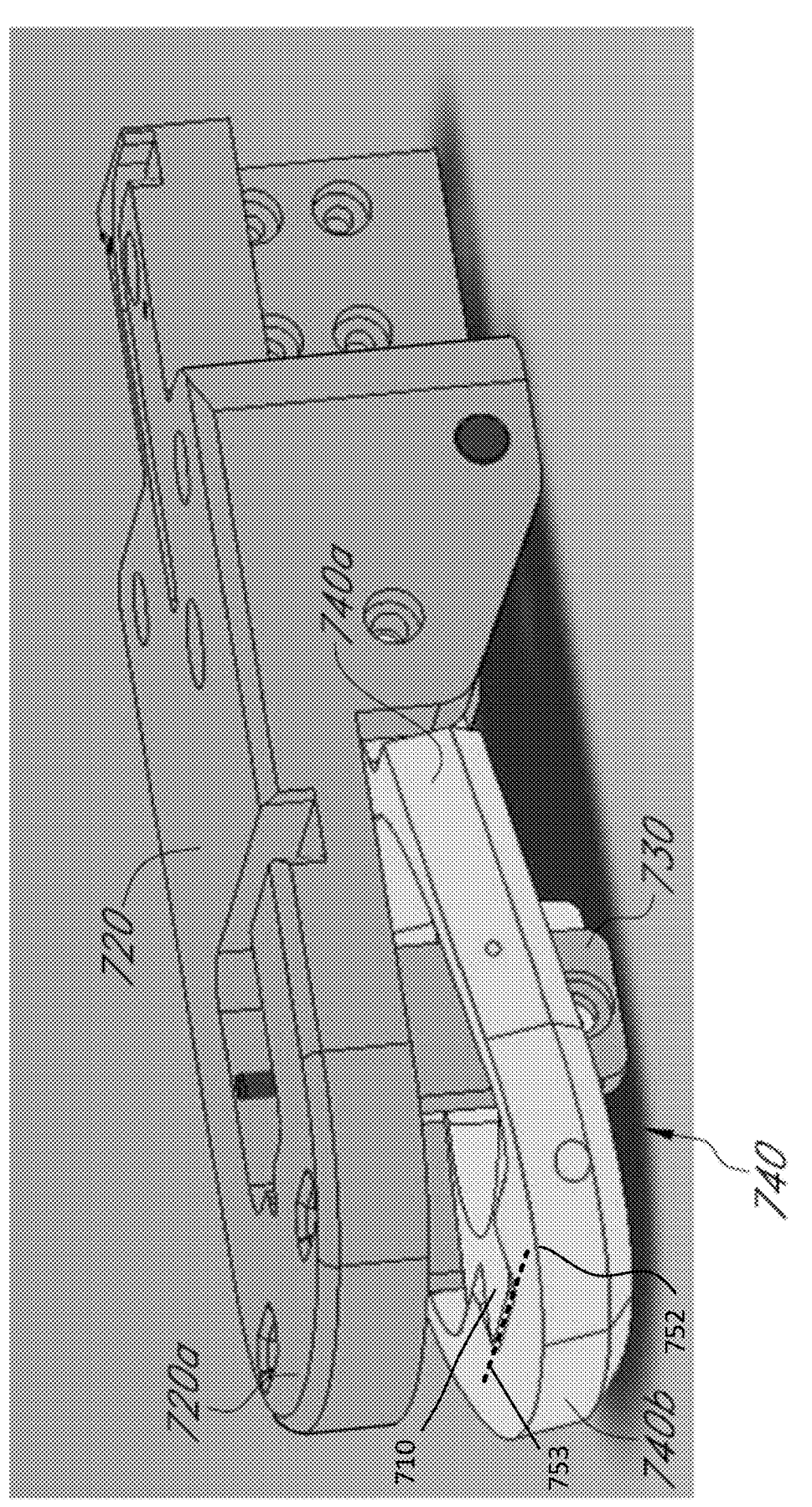
FIGS. 7A-7B illustrates the coupling of a cam with a release lever of a bottle interface assembly, according to various embodiments.
Figure 7B:
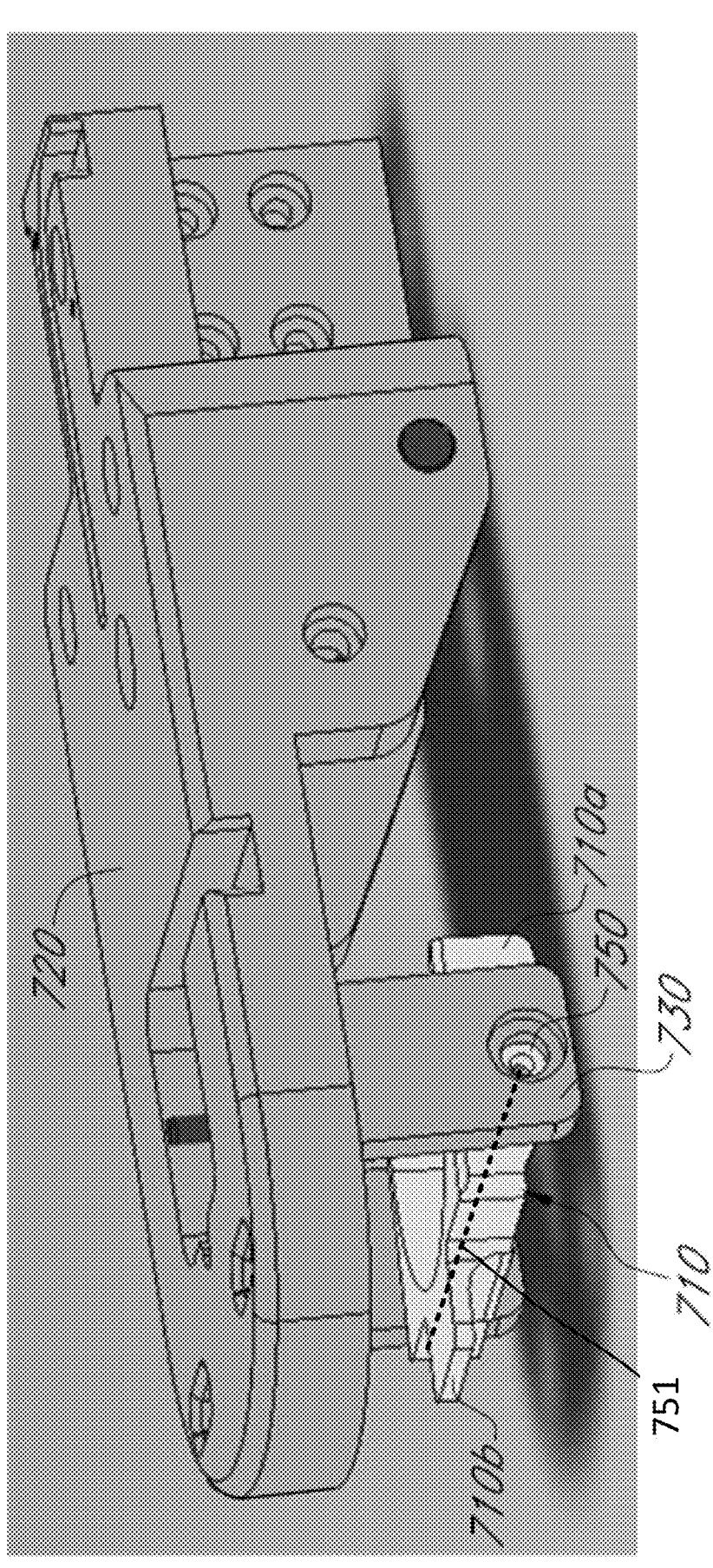

Returning to FIG. 4, in various embodiments, the bottle interface assembly 400 may include a cam 430 that is coupled to the release lever 420 and the base 410. For example, the cam 430 may be coupled to the second lever section 420*b* and one or more projections of the base (e.g., such non-limiting examples of projections may be projections 510*a*, 510*b* of FIG. 5) extending from the platform of the base 410. FIGS. 7A and 7B show the coupling of the cam 710 with the release lever 740 and the base 720, in various embodiments. In various embodiments, as discussed above, a distal end 720*a* of the base 720 may have one or more projections 730 projecting substantially perpendicularly from (e.g., vertical to) the platform or top surface of the base 720 (e.g., a horizontal plane). In various embodiments, the cam 710 is positioned underneath the base 720 and may has a first cam section 710*a* that is rotatably coupled to the one or more projections 730 of the base 720 at a first hinge point 750 (having a rotational axis shown by a dotted line 751. In various embodiments, the cam 710 has a second cam section 710*b* that is configured to rotatably couple to a second lever section 740*b* of the release lever 740 at a second hinge point 752 (having a rotational axis shown by a dotted line 753). That is, the release lever 740 may have a first lever section 740*a* (where first lever section 740*a* is a non-limiting example of first lever section 420*a* of FIG. 4) and a second lever section 740*b* (where second lever section 740*b* is a non-limiting example of first lever section 420*b* of FIG. 4), and the second cam section 710*b* may couple to the second lever section 740*b* of the release lever 740.

In various embodiments, the coupling of the cam 710 with the release lever 740 and the base 720 may be such that when the second lever section 740*b* is pressed towards the distal end 720*a* of the base 720 to actuate the bottle interface assembly (e.g., as discussed above referencing a non-limiting example as seen in FIGS. 6A-6C), the second cam section 710*b* rotates towards the distal end 720*a* along with the second lever section 740*b* about the hinge point 750, which is the hinge point where the first cam section 710*a* couples to the projection 730 of the base 720.

Returning to FIG. 4, in various embodiments, the bottle interface assembly 400 includes a gross alignment member 460 and a male element 480 having a first male element section 480*a* and a second male element section 480*b*. In various embodiments, the gross alignment member 460 may be coupled (e.g., fixedly) to the base 410. For example, the base 410 may have a through-bore (e.g., through the vertical thickness of the base 410), and the gross alignment member 460 may be fixedly attached to the base 410 surrounding the bore from underneath the base 410. The second male element section 480*b* of the male element 480 may then be disposed within the chamber defined by the inner surface of the bore and the inner surface of the gross alignment member 460. In various embodiments, the gross alignment member 460 is configured to align the bottle and cap below the mechanism prior to the male element and female fitting being coupled together.

In various embodiments, the gross alignment member 460 may have a bottom with a gross alignment member opening 470. The gross alignment member 460 and the male element 480 may be configured such that the first male element section 480*a* extends through the gross alignment member opening 470 of the gross alignment member 460 (e.g., while the second male element section 480*b* is disposed within the gross alignment member 460). In various embodiments, the bottle interface assembly 400 may also include a spring 425 that couples the second male element section 480*b* to the gross alignment member 460. For example, one non-limiting example of the spring 425 can be a compression spring and may be pre-loaded to a force at least sufficient to cause the first male element section 480*a* form a seal with a female fitting. For example, one non-limiting example of the first male element section 480*a* may be a male Luer fitting. In such cases, the compression spring, which is a non-limiting example of spring 425 may be configured (e.g., pre-loaded) to apply such a force on the second male element section 480*b* such that the second male element section 480*b*, of which a male Luer fitting is one such non-limiting example forms a Luer seal with a female Luer fitting.

In various embodiments, the bottle interface assembly 400 may also include a sensing mechanism that is configured to sense when the bottle interface assembly 400 is disengaged from the bottle cap (where one non-limiting example is when the bottle interface assembly 240 is disengaged from the bottle cap 230 as shown in FIG. 2). For example, the sensing mechanism may include a sensor 405 and a flag element 415 that in combination can sense, and provide an indication of, whether the bottle interface assembly 400 is disengaged from the bottle cap. In various embodiments, the sensing mechanism may be a contact sensing mechanism that is configured to sense when the sensor 405 contacts the flag element 415. For example, the sensor 405 and the flag element 415 may contact each other when the bottle interface assembly 400 is disengaged from the bottle cap, as discussed in more details below. In such cases, the sensor 405 may sense the contact, and generate a signal indicating the contact (e.g., and equivalently the disengagement of the bottle interface assembly 400 from the bottle cap). For example, the signal can be a visual signal, and/or an audio signal. In various embodiments, the sensor 405 may be an infrared (IR) sensor that is configured to detect the presence (or absence) of the flag element 415.

Figure 8A:
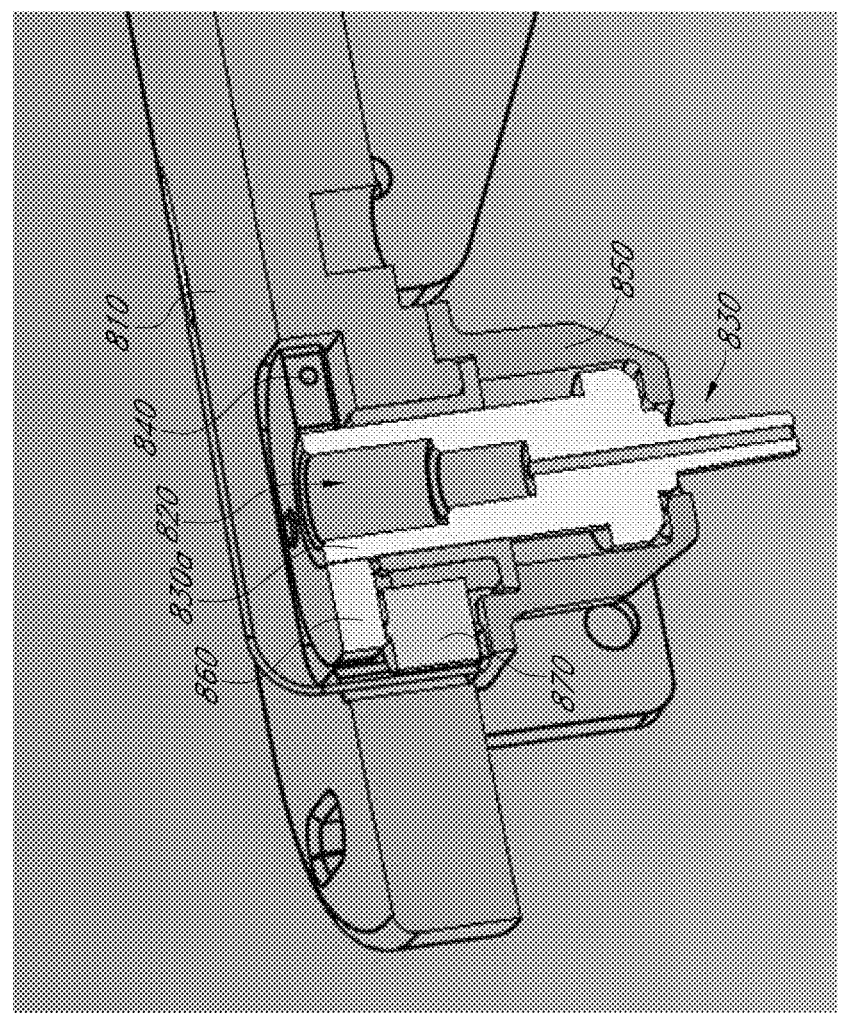
FIGS. 8A-8B illustrates the coupling between a male element, a gross alignment member, and a contact sensing mechanism of a bottle interface assembly, according to various embodiments.

In various embodiments, the sensor 405 may be fixedly connected to the base 410 and the flag element 415 may be positioned above the base 410 and fixedly connected to the second male element section 480*b*. One non-limiting example, as shown in FIG. 8A, the base 810 may have the aforementioned bore 820 that runs the length of the bore's thickness. The bore 820 may start at a recessed surface 840 of the base 810, and in such embodiments, the second male section 830*a* of the male element 830 that is disposed within the gross alignment member 850 may protrude through the bore 820 and terminate above the recessed surface 840 (e.g., may terminate flush with the un-recessed surface of the base 810, where base 810 is a non-limiting example of base 410 from FIG. 4). In various embodiments, the sensor 870 may be fixedly connected to the base 810. In various embodiments, the flag element 860 may be disposed in the recessed surface 840 of the base 810 and fixedly connected to the second male section 830*a* of the male element 830. That is, the flag element 860 may be positioned above the recessed surface 840 of the base 810 (e.g., and as such, above the base 810 itself).

Figure 8B:
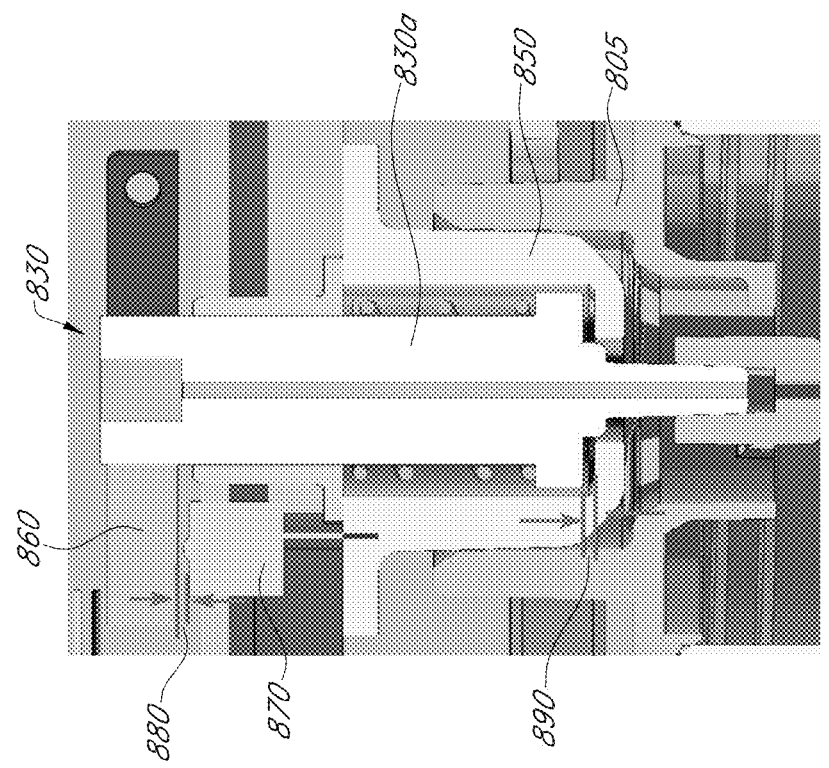

As shown in FIG. 8B, the sensor 870 and the flag element 860 may be separated by a separation 880 that is substantially equal to the separation 890, which is the distance between the bottom of the gross alignment member 850 and the bottom surface of the second male section 830*a* when the gross alignment member 850 is fully engaged with, and seals, a bottle cap 805 of a bottle. Such an arrangement allows the sensor 870 and the flag element 860 to function as sensing mechanism for sensing the disengagement of the bottle interface assembly and the bottle cap 805. This is because when the bottle interface assembly and the bottle cap 805 are fully engaged (e.g., the former seals the latter), the gross alignment member 850 is fully received within the bottle cap 805 and bottom surface of the second male section 830*a* is positioned above the bottom of the gross alignment member 850 by the distance of the separation 890. In various embodiments, the flag element 860 is positioned above the sensor 870 by the distance of the separation 880. Then, when the bottle interface assembly is pulled up by the distance of the separation 890 and the seal is broken (i.e., the bottle interface assembly and the bottle cap 805 start disengaging), the separation 890 and the separation 880 vanish. That is, when the bottle interface assembly disengages with the bottle cap 805, the sensor 870 contacts the flag element 860. The sensor 870 may then generate the visual and/or audio signal indicating the disengagement of the bottle interface assembly from the bottle cap 805 of the bottle.

Figure 9:
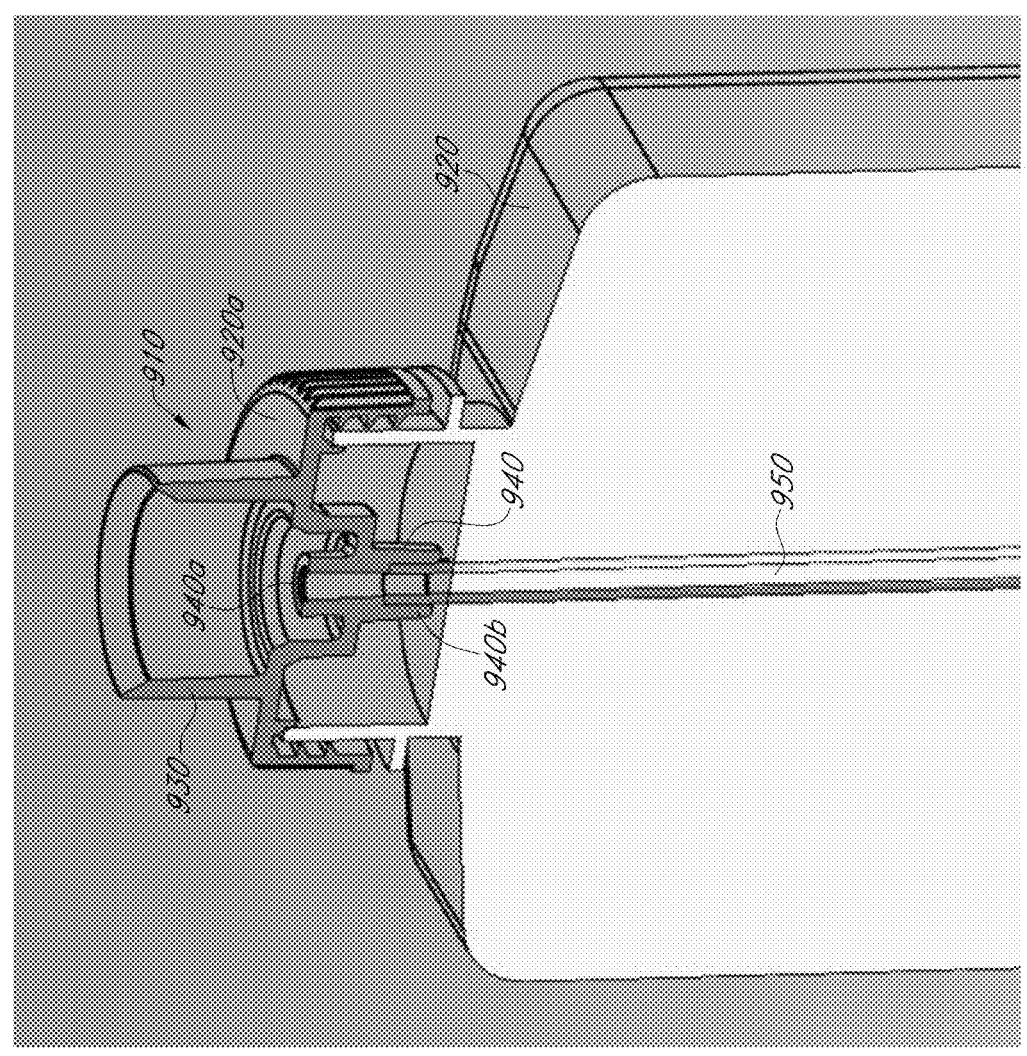
FIG. 9 illustrates a bottle cap with a dip tube capping a bottle for storing reagents, according to various embodiments.

FIG. 9 shows an illustration of a bottle cap 910 that is configured to secure (e.g., via a threaded connection) to a mouth of a bottle 920 and further engage with and form a fluidic connection with a bottle interface assembly, in various embodiments. The bottle cap 910 may include a top surface 920*a*, and a cylinder 930 that is disposed on the top surface 920*a*. In various embodiments, the inner diameter of the cylinder 930 may substantially equal to the outer diameter of the gross alignment member (of which gross alignment member 850 of FIG. 8B is one such non-limiting example) of the bottle interface assembly with which the bottle cap 910 engages. For instance, viewing FIG. 9 in light of the non-limiting reference FIG. 8B, the inner diameter of the cylinder of the bottle cap 805 may be substantially equal to the outer diameter of the gross alignment member 850. As such, when the gross alignment member 850 of the bottle interface assembly is received into the cylinder 930, the outer surface of the gross alignment member 850 may make flush contact with the inner surface of the cylinder 930. In various embodiments, the position of the cylinder 930 on the bottle cap 910 and/or the thickness of the cylinder 930 may be configured such that the inner diameter of the cylinder 930 substantially match the outer diameter of the gross alignment member 850.

In various embodiments, the bottle cap 910 may include a female fitting 940 that is disposed within the cylinder 930. For example, the female fitting 940 may be disposed in the interior of the cylinder 930 coaxially to the cylinder 930. The female fitting 940 may have a first fitting end 940*a* and a second fitting end 940*b*, and these ends may be connected to each other via a hollow path extending therebetween. For example, the female fitting 940 may be a hollow female fitting with a path (e.g., fluid path) running between the first fitting end 940*a* and the second fitting end 940*b*. In various embodiments, at least a portion of the hollow path is tapered from a first, larger diameter to a second, smaller diameter.

In various embodiments, the male element, of which male element 830 is one non-limiting example in FIG. 8A, and the female fitting, of which female fitting 940 is one non-limiting example in FIG. 9, may be reversed. That is, the female fitting 940 is disposed within the gross alignment member 850 and the male element 830 is disposed within the bottle cap 910 such that the female fitting 940 is translated downwards to engage the male element 830 when connecting the assembly to the bottle cap (where bottle cap 910 in FIG. 9 is one non-limiting example of such bottle cap).

Returning to FIG. 9, in various embodiments, the bottle cap 910 may include a dip tube 950. For example, the second fitting end 940*b* of the female fitting 940 may be configured to couple to the dip tube 950. For example, the diameter of the dip tube 950 and the diameter of the second fitting end 940*b* may be such that the former and the latter can be coupled to each other in a leak-proof manner. For instance, the tip of the dip tube 950 may be inserted into the second fitting end 940*b* or the second fitting end 940*b* may be inserted into the tip of the dip tube 950 snuggly enough to form a substantially leak-proof connection. In various embodiments, the dip tube 950 may be long enough to reach the bottom of the bottle 920, thereby allowing for reagents stored in the bottle 920 to be efficiently pumped out.

In various embodiments, the bottle includes two or more ports. In various embodiments, a first port of the two or more ports is configured to draw liquid therefrom. In various embodiments, the first port is coupled to the dip tube 950. In various embodiments, at least a second port of the two or more ports is configured to allow for air flow to thereby equilibrate pressure in the bottle as liquid is removed therefrom. In various embodiments, the at least a second port is formed in the body of the bottle 920. In various embodiments, the at least a second port is formed in the bottle cap 910.

Figure 10:
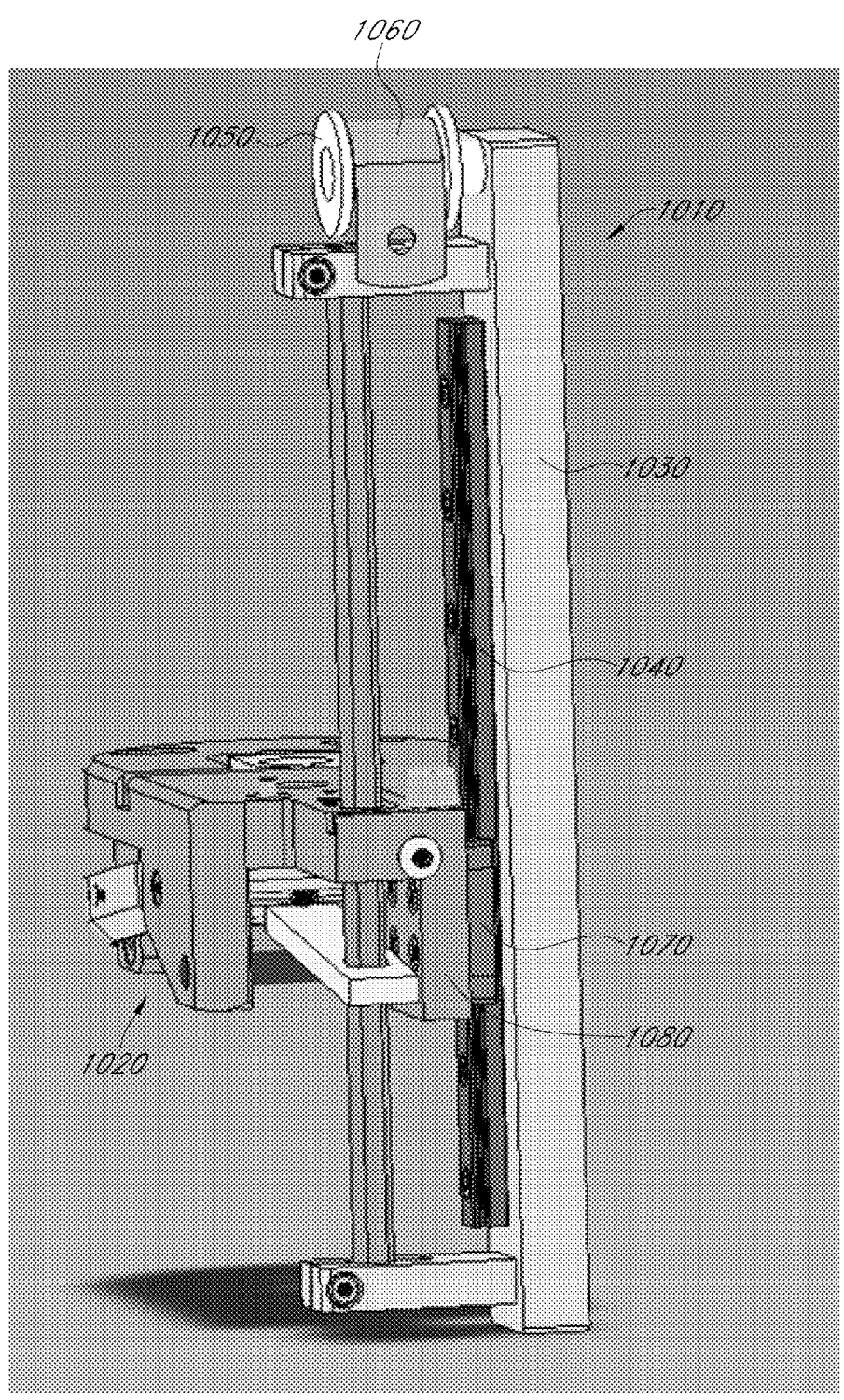
FIG. 10 illustrates an assembly support structure configured to support a bottle interface assembly and facilitate the vertical movement of the bottle interface assembly, according to various embodiments.

FIG. 10 shows an illustration of an assembly support structure 1010 that is configured to support the bottle interface assembly 1020, in various embodiments. As discussed above with non-limiting reference to FIGS. 2 and 3, the assembly support structure 1010 may be configured to facilitate the vertical movement of the bottle interface assembly 1020 above a bottle that is capped with a bottle cap with which the assembly support structure 1010 is configured to be engaged. The assembly support structure 1010 may include a support frame 1030 and a guide rail 1040 that is disposed on the support frame 1030. For example, the guide rail 1040 may extend on the support frame 1030 parallel to it, but may terminate before the end of the support frame 1030. That is, the length of the guide rail 1040 may be shorter than that of the support frame 1030. In various embodiments, at one of its ends past the guide rail 1040, the support frame 1030 may include a spring 1060 that is configured to couple to the bottle interface assembly 1020. For example, the spring 1060 may be a tension spring that is pre-tensioned to be wound onto the wheel 1050. When connected to the bottle interface assembly 1020, the spring 1060 may exert a constant upward force onto the bottle interface assembly 1020. For example, the spring 1060 can be a constant force spring (where one non-limiting example of the constant force spring may be a coil balance spring).

In various embodiments, the assembly support structure 1010 may also include a guide block 1070 configured to couple the bottle interface assembly 1020 to the guide rail 1040. For example, the guide block 1070 couples the base 1080 (e.g., the end of the base 1080 that is proximal to the assembly support structure 1010) to the guide rail 1040. In various embodiments, the guide block 1070 may be configured to travel along the guide rail 1040. For example, when the bottle interface assembly 1020 is in an actuated configuration, the guide block 1070 may transport the bottle interface assembly 1020 along the guide rail 1040 when the bottle interface assembly 1020 is under an upward force (e.g., from the spring 1060, where one non-limiting example of the spring may be a tension spring) or downward force (where one non-limiting example of a downward force may be a downward force applied by a user).

V. Operations of a Bottle Interface Assembly

The following various example embodiments disclosed may contain various labels throughout this section. The labels provided are not meant to be limiting in anyway and should not be construed as such. The labels are provided to best explain, by way of nonlimiting and non-exhaustive examples, the various embodiments provided.

Figure 11:
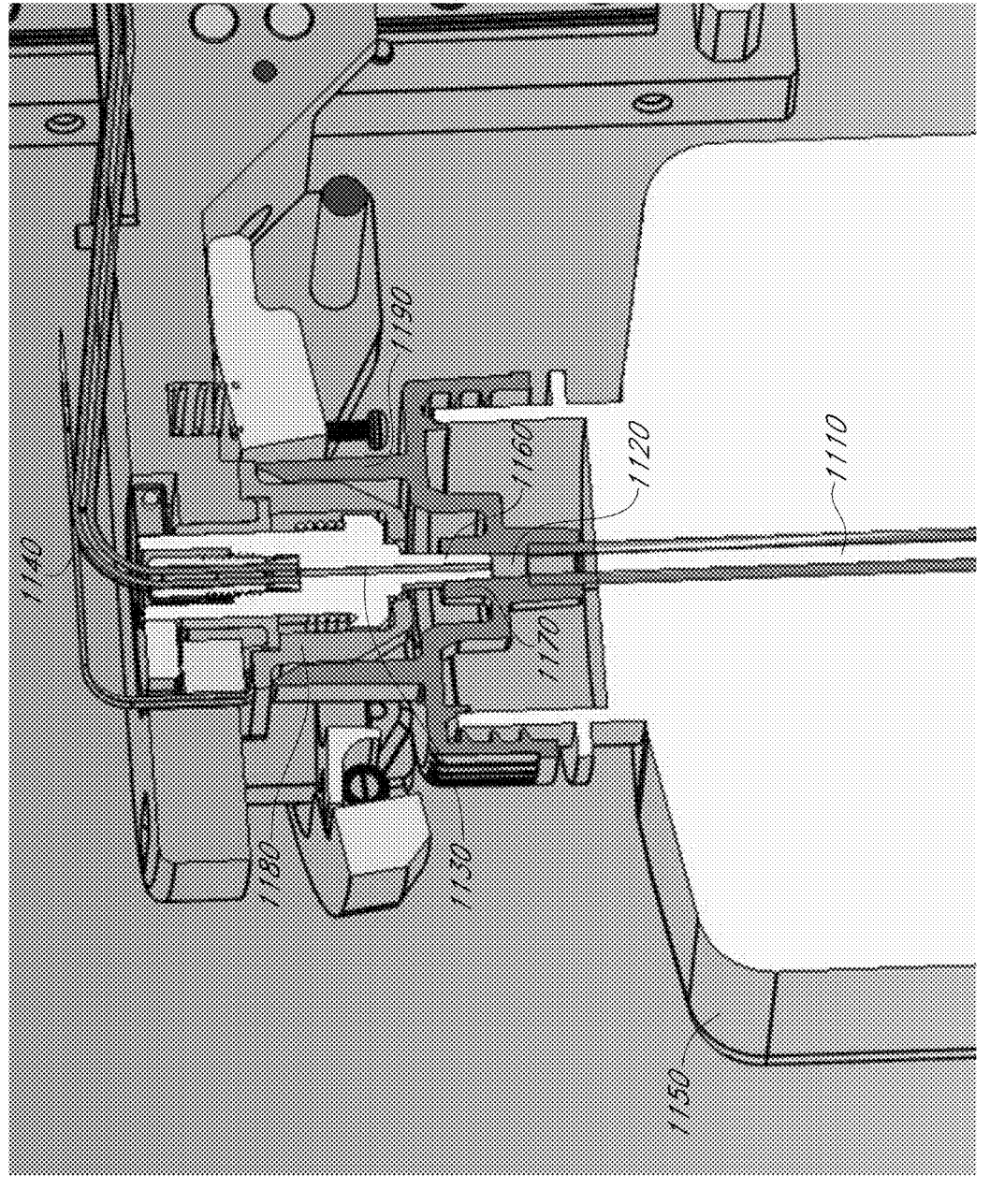
FIG. 11 illustrates the sealing of a capped bottle with a bottle interface assembly, according to various embodiments.

In various embodiments, when a bottle interface assembly 1020 is in its resting configuration and fully engaged with a capped bottle. In various embodiments, the capped bottle may be sealed. In various embodiments, a continuous fluid path is formed between the interior of the bottle and the exterior of the bottle via the bottle interface assembly (e.g., to fluidics module of the opto-fluidic instrument). As discussed above, the stripping and/or washing reagents that are used to prepare a sample 110 for target molecule identification may be stored in such sealed bottles in the fluidics module 140 of an opto-fluidic instrument 120. The bottles may be fluidically connected, via the continuous fluid path, to pumps that pump the reagents to the sample module 160 of the opto-fluidic instrument 120 that contains the sample. FIG. 11 shows such a continuous fluid path between the interior and the exterior of the bottle 1150 that includes a dip tube 1110, a hollow interior 1120 of a female fitting 1170, and a hollow interior 1130 of a male element. In various embodiments, the fluid path may be coupled to a tube 1140 that is exterior to the bottle interface assembly 1020 and is fluidically coupled to a pump and/or additional tubes that deliver the reagents from the interior of the capped and sealed bottle 1150 to the sample 110.

In various embodiments, one or more of the dip tube 1110, the hollow interior 1120 of the female fitting 1170, and the hollow interior 1130 of the male element may be made from a material that is chemically compatible with dimethyl sulfoxide (DMSO). For example, the material can be low-density polyethylene (LDPE), high-density polyethylene (HDPE), polypropylene, polypropylene copolymer (PPCO), polymethylpentene, nylon, fluorinated ethylene propylene, or combination thereof.

In various embodiments, a bottle interface assembly 1020 may be referred to as fully engaged with a bottle cap 910 (e.g., and the bottle may be referred to as a sealed bottle) when the male fitting 1160 is fully engaged with (e.g., fully inserted into) the female fitting 1170 such that the connection is sealed. For example, the male fitting 1160 can be a male Luer fitting, the female fitting 1170 can be a female Luer fitting. In such cases, the bottle interface assembly 1020 and the bottle cap 910 may be considered to be fully engaged, and the bottle cap 910 sealed, when the connection between the male and female Luer fitting results in a sealed Luer taper connection. In various embodiments, the outer surface of the gross alignment member 1180 may make flush contact with the inner surface of the cylinder 1190 of the bottle cap 805. For example, referring to FIG. 8B, the bottle interface assembly 1020 and the bottle cap 805 may be considered to be fully engaged, and the bottle cap 805 sealed, when the gross alignment member 850 is fully inserted into the cylinder 930 of the bottle cap 805 to such an extent that the sensor 870 is separated from, and fails to contact, the flag element 860.

Figure 12:
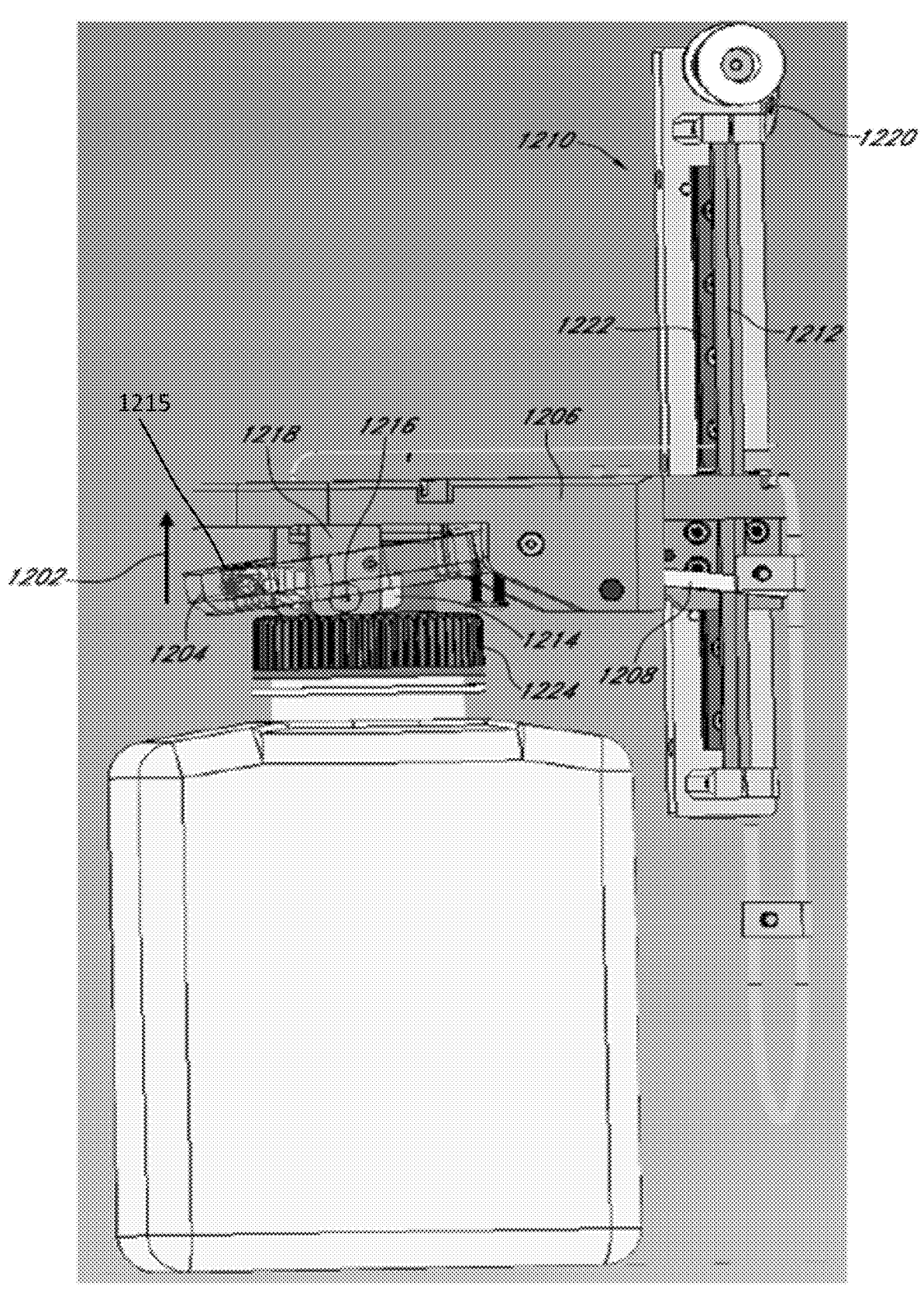
FIG. 12 illustrates a capped bottle, a bottle interface assembly engaged with the capped bottle, and an assembly support structure supporting the bottle interface assembly, according to various embodiments.

In various embodiments, to initiate the disengagement of a bottle interface assembly from a capped bottle (e.g., and as a result the unsealing of the capped bottle), the bottle interface assembly 1020 may be actuated, i.e., its configuration changed from a resting to an actuated configuration, by applying an upward force 1202 to the distal end of the release lever 1204 of the bottle interface assembly 1020 to rotate it towards the distal end of the base 1206, as shown in FIG. 12 (the terms "distal" and "proximal" are from the perspective of the assembly support structure 1210). This may cause the proximal end of the release lever 1204 (hidden behind the shank of the base 1206) to apply a downward force on the distal end of the brake bar 1208, resulting in the brake bar 1208 forming a substantially perpendicular angle with the shaft 1212, as discussed above in more detail with reference to FIGS. 6A-6C. With the brake bar 1208 at a substantially perpendicular angle with respect to the shaft 1212, the locking mechanism that maintains the bottle interface assembly 1020 in place on the assembly support structure 1210 is unlocked (e.g., there is minimal to no friction between the brake bar—specifically, the bore of the brake bar—and the shaft). In various embodiments, the tension spring 1220 (of which one non-limiting example may be coil balance spring) may be coupled to the proximal end of the base 1206. In such cases, the upward constant force that is exerted on the base 1206 by the tension spring 1220 may cause the bottle interface assembly 1020 to translate upwards on the guide rail 1222 of the assembly support structure 1210.

While applying the upward force 1202 to the distal end of the release lever 1204, because of the coupling of the cam 1214 with the distal end of the release lever 1204 at a distal hinge point 1215, the rotation of the release lever 1204 in the direction of the upward force 1204 causes the coupled distal end of the cam 1214 to rotate in the same direction (e.g., clockwise) about the hinge point 1216. Referring to FIGS. 7A-7B, the hinge point 750 is where the cam 710 is rotatably hinged to one or more projections 730 of the base 720 and may be located on the cam 710 between the distal end 710b of the cam 720 and the proximal end of the first cam section 710a of the cam 720. Upon rotation of the cam 720 about the hinge point 750, in various embodiments, the proximal end of the first cam section 710a of the cam 720 may make contact with the top surface of the bottle cap 1224 (e.g., the top surface 920a of the bottle cap 910 in FIG. 9). The reactive force from the top surface of the bottle cap 1224 may exert an upward force 1202 on the projection 1218 (e.g., and as such on the base 1206). Such an upward force 1202 may break the sealed connection between the bottle interface assembly 1020 and the bottle cap 1224. For example, with reference to FIG. 11, the upward force 1202 may break the Luer seal between the male fitting 1160 and the female fitting 1170, and cause the gross alignment member 1180 to move upwards and make contact with the male element. That is, with reference to FIG. 8B, the upward force 1202 may cause the gross alignment member 850 to move upwards such that the gross alignment member 850 contacts the second male section 830*a* of the male element 830 and the sensor 870 contacts the flag element 960. The sensor 870 may then generate a signal indicating that the bottle interface assembly 1020 is disengaged from the capped bottle.

In various embodiments, the tension spring 1220 provides a predetermined amount of force that is sufficient to support the bottle connection assembly such that the assembly does not fall down when it is not connected to a bottle. In various embodiments, the upward force 1202 from the tension spring 1220 may be sufficient to break the sealed connection (e.g., Luer seal) between the bottle interface assembly 1020 and the bottle cap 1224. In various embodiments, the sealed connection may be disconnected by the upward force 1202 from the top surface of the bottle cap 1224. Once the seal is broken, however, the constant upward force 1202 from the tension spring 1220 may exert enough force to cause the bottle interface assembly 1020 slide up along the guide rail 1222, provided the bottle interface assembly 1020 is in its actuated configuration, thereby completely disengaging and separating the bottle interface assembly 1020 from the bottle cap 1224. That is, in various embodiments, the bottle interface assembly 1020 may be in its actuated configuration for it to translate along the guide rail 1222 in response to the constant upward force 1202 from the tension spring 1220. If the bottle interface assembly 1020 is switched to its resting configuration by, for example, ceasing to exert the upward force 1202 to the proximal end of the release lever 1204, the brake bar 1208 may assume an angle 690 that is non-perpendicular with the straight shaft 1212, locking the bottle interface assembly 1020 in place on the assembly support structure 1210 (e.g., via friction between the bore of the brake bar and the shaft). Once disengaged, to re-engage the bottle interface assembly 1020 with the bottle cap 1224, in various embodiments, the bottle interface assembly 1020 may be switched to its actuated configuration, and a downward force may be applied to the base 1206 until a sealed connection is formed between the bottle interface assembly 1020 and the bottle cap 1224.

Various embodiments of the present disclosure disclose an assembly that comprises a base, a release lever 1204, a cam 710, a brake bar 1208, a straight shaft 1212, a gross alignment member 1180, and a male element. In various embodiments, the base 1206 may include at least one projection. In various embodiments, the release lever 1204 may include a first lever section and a second lever section, where the release lever 1204 is rotatably hinged to the base 1206 at the first lever section 740*a*. In addition, the cam 710 may have a first cam section 710*a* and a second cam section 710*b*, where the first cam section 710*a* is rotatably hinged to the projection of the base 1206 at a first hinge point 1216 and the second cam section 710*b* is coupled to the second lever section of the release lever 1204. In various embodiments, the brake bar 1208 includes a first bar section and a second bar section, where the first bar section is coupled to the first lever end at a coupling point 670 and the second bar end has a bore 820. The straight shaft 1212 may extend through the bore 820. The gross alignment member 1180 is fixedly connected to the base 1206 and includes a bottom having a gross alignment member opening 470. In various embodiments, the male element 830 includes a first male element section 480*a* and a second male element section 480*b*, where the first male element section 480*a* extends through the gross alignment member opening 470 of the gross alignment member 1180 and the second male section 830*a* is disposed within the gross alignment member and fixedly connected to the base 1206. In various embodiments, the release lever 1204, the cam 710, and the brake bar have a resting configuration and an actuated configuration. In the resting configuration, the brake bar 1208 forms an angle 690 that is non-perpendicular with the straight shaft 1212 to limit a relative motion between the brake bar 1208 and the straight shaft 1212. In the actuated configuration, the brake bar 1208 forms an angle 690 that is substantially perpendicular with the straight shaft 1212 to thereby allow the relative motion between the brake bar 1208 and the straight shaft 1212.

In various embodiments, the assembly may comprise a flag element 960 positioned above the base 1206, the flag element 960 or the base 1206 including a sensor configured to detect contact between the base 1206 and the flag element 960. In various embodiments, the base 1206 includes a base opening via which a portion of the second male element section 480*b* protrudes out above the base 1206; and the flag element 960 that is positioned above the base 1206 is fixedly connected to the portion of the second male element section 480*b* that protrudes out above the base 1206.

In various embodiments, the assembly comprises an indicator configured to generate a signal in response to the sensor 870 detecting the contact between the base 1206 and the flag element 960. In various embodiments, the signal is a visual signal, and/or an audio signal. In various embodiments, the assembly comprises a first compression spring coupling the base 1206 and the release lever 1204.

In various embodiments, the assembly comprises a pivot bar 640 coupled to the base 1206, the pivot bar 640 supporting the brake bar 1208 at a fulcrum 660 that is located on the brake bar 1208 between the coupling point 670 and the first lever end. In various embodiments, the brake bar 1208 is configured to seesaw about the fulcrum 660 when the assembly shifts between the resting configuration and the actuated configuration. In addition, the pivot bar 640 is configured to aid the brake bar 1208 maintain the angle 690 that is substantially perpendicular when the assembly is in the actuated configuration. In various embodiments, the assembly comprises a stopper coupled to and extending from the base 1206, the stopper located on the base 1206 such that the brake bar 1208 passes between the stopper and the pivot bar 640. The stopper is also configured to aid the brake bar 1208 maintain the angle 690 that is substantially perpendicular when the assembly is in the actuated configuration.

In various embodiments, when the assembly is in the actuated configuration: (i) the first lever end engages with the first bar end to change the angle 690 between the straight shaft 1212 and the brake bar 1208 from the non-perpendicular to the substantially perpendicular angle; and (ii) the second lever end engages with the second cam section 710*b* to rotate the cam 710 about the first hinge point 1216. In various embodiments, when the assembly is in the actuated configuration: the second cam section 710*b* contacts the top surface 920*a* such that the cam 710 exerts a force to the at least one projection of the base 1206 to force the base 1206 to move in a direction parallel to the straight shaft 1212.

In various embodiments, the assembly comprises a second compression spring coupling the second male element section 480*b* to the gross alignment member. The second compression spring is pre-loaded to a force at least sufficient to cause the first male element section 480*a* form a Luer seal with a female fitting 1170.

In various embodiments, the male element 830 includes a first hollow interior running through both the first male element section 480*a* and the second male element section 480*b*, the first hollow interior establishing a first fluid path between an exterior of the assembly and the first male element section 480*a*. In various embodiments, the first hollow interior of the male element 830 is made from one or more materials that are chemically compatible with dimethyl sulfoxide (DMSO), such as but not limited to low-density polyethylene (LDPE), high-density polyethylene (HDPE), polypropylene, polypropylene copolymer (PPCO), polymethylpentene, nylon, and/or fluorinated ethylene propylene.

In various embodiments, the assembly comprises a linear guide including a guide block 1070 and a guide rail 1040, wherein: the guide rail 1040 extends parallel to the straight shaft 1212 and terminates at a height above the base 1206; the guide block 1070 is configured to couple the base 1206 to the guide rail 1040; and the guide block 1070 is configured to travel on the guide rail 1040 during the relative motion between the brake bar 1208 and the straight shaft 1212. In various embodiments, the assembly comprises a tension spring 1220 having a first spring end and a second spring end, the first spring end coupled to the base 1206 and the second spring end terminating at or above the height of the guide rail 1040. In various embodiments, one non-limiting example of the tension spring 1220 is a coil balance spring. In various embodiments, the assembly comprises a mounting frame configured to support the linear guide.

Various embodiments of the present disclosure disclose a system for interfacing a bottle, the system comprising the afore-mentioned assembly and a bottle cap 1224 capping the bottle, the bottle cap 1224 positioned below the base 1206 and having a female fitting 1170 that is configured to engage with the first male element section 480*a* to form a sealed connection. In various embodiments, when the assembly is in the actuated configuration, the base 1206 applies a force, via the gross alignment member, to the second male element section 480*b* to disconnect the sealed connection. In various embodiments, the first male element section 480*a* is a male Luer fitting, the female fitting 1170 is a female Luer fitting, and the sealed connection is a Luer connection. In various embodiments, the bottle cap 1224 includes a top surface 920*a*, a cylinder 930 disposed on the top surface 920*a*, a cavity walled by the cylinder 930, and the female fitting 1170 that is disposed within the cavity. In various embodiments, the cylinder 930 is configured to receive the gross alignment member. In various embodiments, the bottle cap 1224 includes a top surface 920*a*, a cylinder 930 disposed on the top surface 920*a*, and the hollow female fitting 1170, the hollow female fitting 1170 positioned within, and coaxially to, the cylinder 930.

In various embodiments, the male element 830 includes a first hollow interior running through both the first male element section 480*a* and the second male element section 480*b*, the first hollow interior configured to establish a first fluid path between an exterior of the assembly and the first male element section 480*a*. In various embodiments, the female fitting 1170 is a hollow female fitting 1170 including a first fitting end and a second fitting end connected to each other via a second fluid path. In addition, the first male element section 480*a* is configured to engage with the first fitting end to establish a continuous fluid path between the exterior of the assembly and the second fitting end, the continuous fluid path including the first fluid path and the second fluid path.

In various embodiments, the system for interfacing a bottle comprises a dip tube 1110 having a first tube end and a second tube end, the first tube end fluidically connected to the second fitting end such that the continuous fluid path extends from the exterior of the assembly to the second tube end of the dip tube 1110, the continuous fluid path including the first fluid path, the second fluid path, and the dip tube 1110. In various embodiments, the second fluid path is made from one or more materials that are chemically compatible with dimethyl sulfoxide (DMSO). In various embodiments, the dip tube 1110 is made from one or more materials that are chemically compatible with dimethyl sulfoxide (DMSO) such as but not limited to low-density polyethylene (LDPE), high-density polyethylene (HDPE), polypropylene, polypropylene copolymer (PPCO), polymethylpentene, nylon, and/or fluorinated ethylene propylene.

The labels of the various embodiments of the present disclosure have been provided as nonlimited examples of such various embodiments. The labels listed are not meant to be exhaustive or to be limited to the labels disclosed. Many variations will be apparent to those of ordinary skill in the art without departing from the scope and spirit of the described labels of the various embodiments.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the present teachings are described in conjunction with various embodiments, it is not intended that the present teachings be limited to such various embodiments. On the contrary, the present teachings encompass various alternatives, modifications, and equivalents, as will be appreciated by those of skill in the art. In describing the various embodiments, the specification may have presented a method and/or process as a particular sequence of steps. However, to the extent that the method or process does not rely on the particular order of steps set forth herein, the method or process should not be limited to the particular sequence of steps described, and one skilled in the art can readily appreciate that the sequences may be varied and still remain within the spirit and scope of the various embodiments.

RECITATION OF EMBODIMENT

Embodiment 1: What is embodied is: An assembly, comprising: a base including at least one projection; a release lever including a first lever section and a second lever section, the release lever rotatably hinged to the base at the first lever section; a cam having a first cam section and a second cam section, the first cam section rotatably hinged to the projection of the base at a first hinge point and the second cam section coupled to the second lever section of the release lever; a brake bar including a first bar section and a second bar section, the first bar section coupled to the first lever end at a coupling point and the second bar end having a bore; a straight shaft extending through the bore; a gross alignment member fixedly connected to the base and including a bottom having a gross alignment member opening; and a male element including a first male element section and a second male element section, wherein the first male element section extends through the gross alignment member opening of the gross alignment member and the second male section is disposed within the gross alignment member and fixedly connected to the base, wherein the assembly has a resting configuration and an actuated configuration, such that: in the resting configuration, the brake bar forms a non-perpendicular angle with the straight shaft to limit a relative motion between the brake bar and the straight shaft; and in the actuated configuration, the brake bar forms a substantially perpendicular angle with the straight shaft to thereby allow the relative motion between the brake bar and the straight shaft.

Embodiment 2: The assembly of embodiment 1, further comprising a flag element positioned above the base, the flag element or the base including a sensor configured to detect contact between the base and the flag element.

Embodiment 3: The assembly of embodiment 2, wherein: the base includes a base opening via which a portion of the second male element section protrudes out above the base; and the flag element that is positioned above the base is fixedly connected to the portion of the second male element section that protrudes out above the base.

Embodiment 4: The assembly of embodiments 2 or 3, further comprising an indicator configured to generate a signal in response to the sensor detecting the contact between the base and the flag element.

Embodiment 5: The assembly of embodiment 4, wherein the signal is a visual signal, and/or an audio signal.

Embodiment 6: The assembly of any of the preceding embodiments, further comprising a first compression spring coupling the base and the release lever.

Embodiment 7: The assembly of any of the preceding embodiments, further comprising a pivot bar coupled to the base, the pivot bar supporting the brake bar at a fulcrum that is located on the brake bar between the coupling point and the first lever end.

Embodiment 8: The assembly of embodiment 7, wherein the brake bar is configured to seesaw about the fulcrum when the assembly shifts between the resting configuration and the actuated configuration.

Embodiment 9: The assembly of embodiments 7 or 8, wherein the pivot bar is configured to aid the brake bar maintain the substantially perpendicular angle when the assembly is in the actuated configuration.

Embodiment 10: The assembly of any of embodiments 7-9, further comprising a stopper coupled to and extending from the base, the stopper located on the base such that the brake bar passes between the stopper and the pivot bar.

Embodiment 11: The assembly of embodiment 10, wherein the stopper is configured to aid the brake bar maintain the substantially perpendicular angle when the assembly is in the actuated configuration.

Embodiment 12: The assembly of any of the preceding embodiments, wherein in the actuated configuration: (i) the first lever end engages with the first bar end to change the non-perpendicular angle between the straight shaft and the brake bar to the substantially perpendicular angle; and (ii) the second lever end engages with the second cam section to rotate the cam about the first hinge point.

Embodiment 13: The assembly of any of the preceding embodiments, wherein in the actuated configuration: the second cam section contacts the top surface such that the cam exerts a force to the at least one projection of the base to force the base to move in a direction parallel to the straight shaft.

Embodiment 14: The assembly of any of the preceding embodiments, further comprising a second compression spring coupling the second male element section to the gross alignment member.

Embodiment 15: The assembly of embodiment 14, wherein the second compression spring is pre-loaded to a force at least sufficient to cause the first male element section form a Luer seal with a female fitting.

Embodiment 16: The assembly of any of the preceding embodiments, wherein the male element includes a first hollow interior running through both the first male element section and the second male element section, the first hollow interior establishing a first fluid path between an exterior of the assembly and the first male element section.

Embodiment 17: The assembly of embodiment 16, wherein the first hollow interior of the male element is made from one or more materials that are chemically compatible with dimethyl sulfoxide (DMSO).

Embodiment 18: The assembly of embodiment 17, wherein the one or more materials include low-density polyethylene (LDPE), high-density polyethylene (HDPE), polypropylene, polypropylene copolymer (PPCO), polymethylpentene, nylon, and/or fluorinated ethylene propylene.

Embodiment 19: The assembly of any of the preceding embodiments, further comprising a linear guide including a guide block and a guide rail, wherein: the guide rail extends parallel to the straight shaft and terminates at a height above the base; the guide block is configured to couple the base to the guide rail; and the guide block is configured to travel on the guide rail during the relative motion between the brake bar and the straight shaft.

Embodiment 20: The assembly of embodiment 19, further comprising a tension spring having a first spring end and a second spring end, the first spring end coupled to the base and the second spring end terminating at or above the height of the guide rail.

Embodiment 21: The assembly of embodiment 20, wherein the tension spring is a coil balance spring.

Embodiment 22: The assembly of any of embodiments 19-21, further comprising a mounting frame configured to support the linear guide.

Embodiment 23: A system for interfacing a bottle, the system comprising the assembly of any of embodiments 1-22 and a bottle cap capping the bottle, the bottle cap positioned below the base and having a female fitting that is configured to engage with the first male element section to form a sealed connection.

Embodiment 24: The system of embodiment 23, wherein in the actuated configuration, the base applies a force, via the gross alignment member, to the second male element section to disconnect the sealed connection.

Embodiment 25: The system of embodiments 23 or 24, wherein the first male element section is a male Luer fitting, the female fitting is a female Luer fitting, and the sealed connection is a Luer connection.

Embodiment 26: The system of any of embodiments 23-25, wherein the bottle cap includes a top surface, a cylinder disposed on the top surface, a cavity walled by the cylinder, and the female fitting that is disposed within the cavity.

Embodiment 27: The system of embodiments 26, wherein the cylinder is configured to receive the gross alignment member.

Embodiment 28: The system of any of embodiments 23-27, wherein: the male element includes a first hollow interior running through both the first male element section and the second male element section, the first hollow interior configured to establish a first fluid path between an exterior of the assembly and the first male element section; the female fitting is a hollow female fitting including a first fitting end and a second fitting end connected to each other via a second fluid path; and the first male element section is configured to engage with the first fitting end to establish a continuous fluid path between the exterior of the assembly and the second fitting end, the continuous fluid path including the first fluid path and the second fluid path.

Embodiment 29: The system of embodiment 28, further comprising: a dip tube having a first tube end and a second tube end, the first tube end fluidically connected to the second fitting end such that the continuous fluid path extends from the exterior of the assembly to the second tube end of the dip tube, the continuous fluid path including the first fluid path, the second fluid path, and the dip tube.

Embodiment 30: The system of embodiments 28 or 29, wherein the second fluid path is made from one or more materials that are chemically compatible with dimethyl sulfoxide (DMSO).

Embodiment 31: The system of embodiment 29, wherein the dip tube is made from one or more materials that are chemically compatible with dimethyl sulfoxide (DMSO).

Embodiment 32: The system of embodiment 30 or 31, wherein the one or more materials include low-density polyethylene (LDPE), high-density polyethylene (HDPE), polypropylene, polypropylene copolymer (PPCO), polymethylpentene, nylon, and/or fluorinated ethylene propylene.

Embodiment 33: The system of any of embodiment 23-32, wherein the bottle cap includes a top surface, a cylinder disposed on the top surface, and the hollow female fitting, the hollow female fitting positioned within, and coaxially to, the cylinder.

What is claimed is:

1. An assembly, comprising:
a base including at least one projection;
a release lever including a first lever section and a second lever section, the release lever rotatably hinged to the base at the first lever section;
a cam having a first cam section and a second cam section, the first cam section rotatably hinged to the at least one projection of the base at a first hinge point and the second cam section coupled to the second lever section of the release lever;
a brake bar including a first bar section and a second bar section, the first bar section coupled to the first lever section at a coupling point and the second bar section having a bore;
a straight shaft extending through the bore;
a gross alignment member fixedly connected to the base and including a bottom having a gross alignment member opening; and
a male element including a first male element section and a second male element section, wherein the first male element section extends through the gross alignment member opening of the gross alignment member and the second male element section is disposed within the gross alignment member and fixedly connected to the base, wherein the assembly has a resting configuration and an actuated configuration, such that:

in the resting configuration, the brake bar forms a non-perpendicular angle with the straight shaft to limit a relative motion between the brake bar and the straight shaft; and
in the actuated configuration, the brake bar forms a perpendicular angle with the straight shaft to thereby allow the relative motion between the brake bar and the straight shaft.

2. The assembly of claim 1, further comprising a flag element positioned above the base, the flag element or the base including a sensor configured to detect contact between the base and the flag element.

3. The assembly of claim 2, wherein:
the base includes a base opening via which a portion of the second male element section protrudes out above the base; and
the flag element that is positioned above the base is fixedly connected to the portion of the second male element section that protrudes out above the base.

4. The assembly of claim 2, further comprising an indicator configured to generate a signal in response to the sensor detecting the contact between the base and the flag element.

5. The assembly of claim 4, wherein the signal is a visual signal, and/or an audio signal.

6. The assembly of claim 1, further comprising a first compression spring coupling the base and the release lever.

7. The assembly of claim 1, further comprising a pivot bar coupled to the base, the pivot bar supporting the brake bar at a fulcrum that is located on the brake bar between the coupling point and the bore.

8. The assembly of claim 7, wherein the brake bar is configured to seesaw about the fulcrum when the assembly shifts between the resting configuration and the actuated configuration.

9. The assembly of claim 7, wherein the pivot bar is configured to aid the brake bar maintain the perpendicular angle when the assembly is in the actuated configuration.

10. The assembly of claim 7, further comprising a stopper coupled to and extending from the base, the stopper located on the base such that the brake bar passes between the stopper and the pivot bar.

11. The assembly of claim 10, wherein the stopper is configured to aid the brake bar maintain the perpendicular angle when the assembly is in the actuated configuration.

12. The assembly of claim 1, wherein in the actuated configuration:
(i) the first lever section engages with the first bar section to change the non-perpendicular angle between the straight shaft and the brake bar to the perpendicular angle; and
(ii) the second lever section engages with the second cam section to rotate the cam about the first hinge point.

13. The assembly of claim 1, wherein in the actuated configuration:
the second cam section contacts a top surface such that the cam exerts a force to the at least one projection of the base to force the base to move in a direction parallel to the straight shaft.

14. The assembly of claim 1, further comprising a second compression spring coupling the second male element section to the gross alignment member.

15. The assembly of claim 14, wherein the second compression spring is pre-loaded to a force at least sufficient to cause the first male element section to form a Luer seal with a female fitting.

16. The assembly of claim 1, wherein the male element includes a first hollow interior running through both the first male element section and the second male element section, the first hollow interior establishing a first fluid path between an exterior of the assembly and the first male element section.

17. The assembly of claim 16, wherein the first hollow interior of the male element is made from one or more materials that are chemically compatible with dimethyl sulfoxide (DMSO).

18. The assembly of claim 17, wherein the one or more materials include low-density polyethylene (LDPE), high-density polyethylene (HDPE), polypropylene, polypropylene copolymer (PPCO), polymethylpentene, nylon, and/or fluorinated ethylene propylene.

19. The assembly of claim 1, further comprising a linear guide including a guide block and a guide rail, wherein:

the guide rail extends parallel to the straight shaft and terminates at a height above the base;

the guide block is configured to couple the base to the guide rail; and the guide block is configured to travel on the guide rail during the relative motion between the brake bar and the straight shaft.

20. The assembly of claim 19, further comprising a tension spring having a first spring end and a second spring end, the first spring end coupled to the base and the second spring end terminating at or above the height of the guide rail.

* * * * *